(12) United States Patent
Beeman et al.

(10) Patent No.: US 11,334,907 B1
(45) Date of Patent: *May 17, 2022

(54) STRUCTURED FINE PRINT

(71) Applicant: Groupon, Inc., Chicago, IL (US)

(72) Inventors: David Beeman, San Francisco, CA (US); Neil Crist, Snoqualmine, WA (US); Jon Hackbarth, San Francisco, CA (US); Jacob Johnston, Chicago, IL (US); Timothy P. Galeckas, Aurora, IL (US); Amit Koren, San Carlos, CA (US); Francisco Jose Larrain, Palo Alto, CA (US); Tanya Koshy, Sunnyvale, CA (US); Karan Kaushik, San Francisco, CA (US); Ricardo Andres Zilleruelo Ramos, Mountain View, CA (US); Matias Esteban Arenas, Santiago (CL); Kavita Kochar, Chicago, IL (US); Stephen Wooten, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,987

(22) Filed: Nov. 16, 2020

Related U.S. Application Data

(63) Continuation of application No. 16/047,392, filed on Jul. 27, 2018, now Pat. No. 10,867,318.

(60) Provisional application No. 62/538,072, filed on Jul. 28, 2017.

(51) Int. Cl.
  *G06Q 30/02* (2012.01)

(52) U.S. Cl.
  CPC .............................. *G06Q 30/0241* (2013.01)

(58) Field of Classification Search
  CPC ................................................. G06Q 30/0241
  See application file for complete search history.

(56) References Cited

U.S. PATENT DOCUMENTS

| 9,870,629 | B2 | 1/2018 | Cardno et al. |
| 2014/0122200 | A1 | 5/2014 | Granville |

*Primary Examiner* — Azam A Ansari
(74) *Attorney, Agent, or Firm* — Alston & Bird LLP

(57) ABSTRACT

A method, apparatus, and computer program product are disclosed to improve utilization of fine print for a document. An example method includes receiving information identifying a location and a domain associated with the document, and identifying, based on the received location and domain, a set of fine print clause data structures relevant to the location and the domain. The method further includes transmitting an indication of the set of identified fine print clause data structures to the developer device, and receiving an indication of a selection of a subset of the set of fine print data structures. Finally, the method includes causing generation of a visual representation of the document that displays fine print clauses corresponding to the subset, wherein the location of the fine print clauses in the visual representation is based on a categorization of the fine print clause data structures corresponding to the fine print clauses.

20 Claims, 23 Drawing Sheets

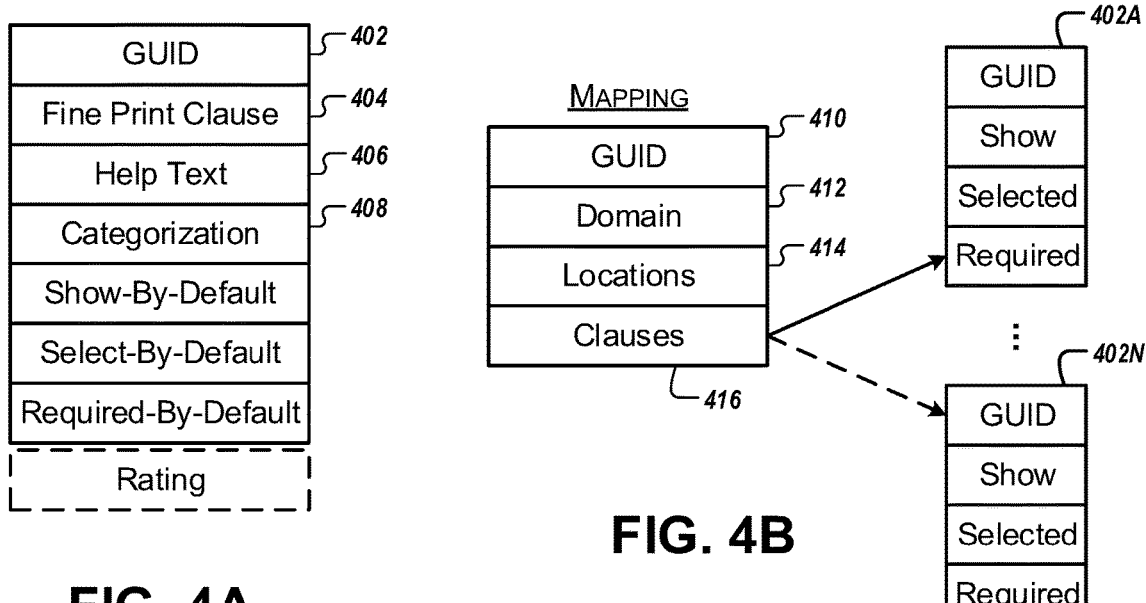
FIG. 4A
FIG. 4B
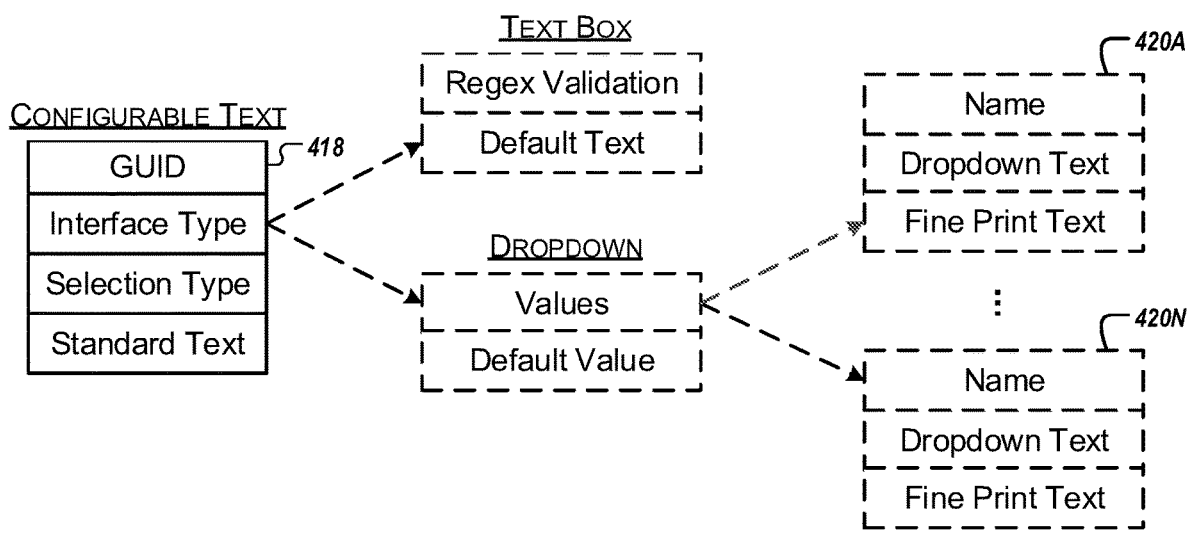
FIG. 4C

- Not valid until 1/1/2015.
- Reservation required, same day reservations accepted.
- ☑ Must reserve by 2016-10-06.
- Redemption only available through Groupon.com.
- May split Groupon between 2 people.
- May redeem across visits.
- Entire voucher value must be used in one purchase.
- All goods or services must be used by the same person.

Fig. 7E

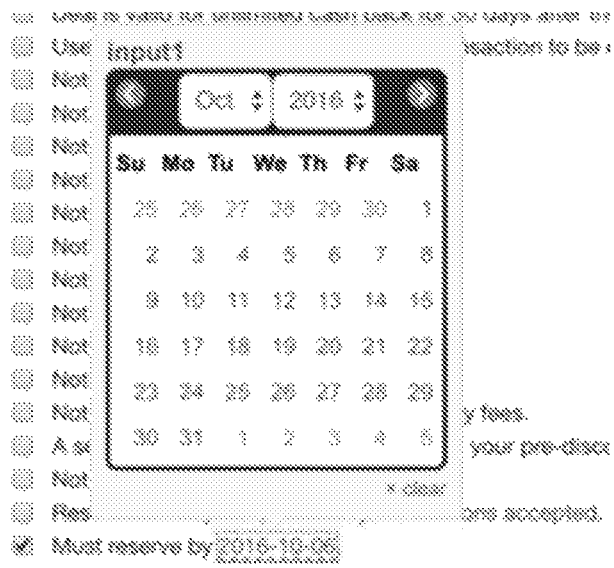

Fig. 7F

- Not valid toward taxes, gratuity or delivery fees.
- A service charge of 18% will be added to your pre-discounted bill.
- Not valid until 1/1/2015.
- Reservation required, same day reservations accepted.
- ☑ Must reserve by 2016-10-26.

Not Recommended

- Not valid on Federal Holidays.
- Not valid on Valentine's Day.
- Not valid on Thanksgiving.
- Not valid on Christmas Eve.
- Not valid on Christmas.
- Not valid on New Year's Eve.
- Not valid on New Year's Day.
- Not valid on Father's Day.
- Not valid on Mother's Day.
- Not valid on Easter.

Fig. 7K

○ User must spend a minimum of 6 p...
✓ Not valid on Federal Holidays.
✓ Not valid on Valentine's Day.
○ Not valid on Thanksgiving.

Fine Print
May be repurchased every 90 days. Not valid on Federal Holidays. Not valid on Valentine's Day. Limit 1 per person, may buy 1 additional as gift. Limit 1 per visit.

Fig. 7L

5. Set Your Fine Print

Required

☑ Limit 1 per person, may buy 1 additional as a gift.

☑ Limit 1 per visit.

☑ Limit of 2 tastings.

☑ Limit of 2 drinks.

Optional

☐ Limit 1 per table.

☐ Reservation required.

☐ Valid only for option purchased.

FIG. 12B

STRUCTURED FINE PRINT

CROSS-REFERENCE TO RELATED APPLICATIONS

This application is a continuation of and claims priority to U.S. application Ser. No. 16/047,392, filed Jul. 27, 2018, which claims the benefit of U.S. Provisional Patent Application No. 62/538,072, filed Jul. 28, 2017, the entire contents of which are incorporated herein by reference.

TECHNOLOGICAL FIELD

Example embodiments of the present invention relate generally to document generation and, more particularly, to a method and apparatus for improving the generation and utilization of fine print for documents.

BACKGROUND

Applicant has discovered problems with current methods for generating and utilizing fine print in documents. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for improving the generation of fine print for documents.

In a first example embodiment, an apparatus is provided for improved utilization of fine print for a document. The apparatus includes a processor and a memory, and the memory stores computer program code that, when executed by the processor, causes the apparatus to receive, from a developer device, information identifying a location and a domain associated with the document, and identify, based on the received location and domain, a set of fine print clause data structures relevant to the location and the domain, wherein each particular fine print clause data structure in the set includes a field defining a categorization of that particular print clause data structure. The computer program code, when executed by the processor, further causes the apparatus to transmit an indication of the set of identified fine print clause data structures to the developer device, receive, from the developer device and in response to transmission of the set of identified fine print clause data structures, an indication of a selection of a subset of the set of fine print data structures, and cause generation of a visual representation of the document that displays fine print clauses corresponding to the subset of the set of fine print data structures, wherein the location of the fine print clauses in the visual representation is based on the categorization of the fine print clause data structures corresponding to the fine print clauses.

In some embodiments of the apparatus, identifying the set of fine print clause data structures relevant to the location and the domain comprises searching the memory for one or more mapping data structures associated with the received location and domain, receiving search results comprising the one or more mapping data structures, and retrieving fine print clause data structures identified within the one or more mapping data structures, wherein the relevant fine print clause data structures comprise the retrieved fine print clause data structures.

In some embodiments, the computer program code, when executed by the processor, further causes the apparatus to retrieve, from the one or more mapping data structures and for each fine print clause data structure in the set of fine print clause data structures, presentation information indicating whether a fine print clause associated with the fine print clause data structure should be shown to a user for selection, should be pre-selected for inclusion in the promotion, or is required for the promotion, wherein transmitting the indication of the set of identified fine print clause data structures to the developer device includes transmitting the presentation information.

In some embodiments, at least one fine print clause data structure from the set of fine print clause data structures includes a configurable text data structure, wherein the indication of selection of the subset of the set of configured fine print data structures further indicates a selection of text for the configurable text data structure.

In some embodiments, the computer program code, when executed by the processor, further causes the apparatus to determine whether the subset of the set of configured fine print data structures comprises an optimal set of fine print data structures for the document. In some such embodiments, each fine print clause data structure includes a rating indicating its impact upon performance of the document, and determining whether the subset of the set of configured fine print data structures comprises an optimal set of fine print data structures for the document is based on the rating of each fine print clause data structure in the subset of the set of fine print data structures. Additionally or alternatively, the computer program code, when executed by the processor, may cause the apparatus to transmit an indication of whether the subset of the set of configured fine print data structures comprises an optimal set of fine print data structures for the document. As yet another additional or alternative feature, the computer program code, when executed by the processor, may cause the apparatus to, in an instance in which the subset of the set of configured fine print data structures does not comprise an optimal set of fine print data structures for the document, generate a recommended modification to the subset of the set of fine print data structures, and transmit an indication of the recommended modification.

In another example embodiment, a method is provided for improved utilization of fine print for a document. The method includes receiving, from a developer device, information identifying a location and a domain associated with the document, identifying, by a processor and based on the received location and domain, a set of fine print clause data structures relevant to the location and the domain, wherein each particular fine print clause data structure in the set includes a field defining a categorization of that particular print clause data structure, transmitting an indication of the set of identified fine print clause data structures to the developer device, receiving, from the developer device and in response to transmission of the set of identified fine print clause data structures, an indication of a selection of a subset of the set of fine print data structures, and causing generation of a visual representation of the document that displays fine print clauses corresponding to the subset of the set of fine print data structures, wherein the location of the fine print clauses in the visual representation is based on the categorization of the fine print clause data structures corresponding to the fine print clauses.

In some embodiments, identifying the set of fine print clause data structures relevant to the location and the domain comprises searching the memory for one or more mapping data structures associated with the received location and domain, receiving search results comprising the one or more mapping data structures, and retrieving fine print clause data structures identified within the one or more mapping data structures, wherein the relevant fine print clause data structures comprise the retrieved fine print clause data structures.

In some embodiments, the method further includes retrieving, from the one or more mapping data structures and for each fine print clause data structure in the set of fine print clause data structures, presentation information indicating whether a fine print clause associated with the fine print clause data structure should be shown to a user for selection, should be pre-selected for inclusion in the promotion, or is required for the promotion, wherein transmitting the indication of the set of identified fine print clause data structures to the developer device includes transmitting the presentation information.

In some embodiments, at least one fine print clause data structure from the set of fine print clause data structures includes a configurable text data structure, and the indication of selection of the subset of the set of configured fine print data structures further indicates a selection of text for the configurable text data structure.

In some embodiments, the method includes determining, by the processor, whether the subset of the set of configured fine print data structures comprises an optimal set of fine print data structures for the document. In some such embodiments, each fine print clause data structure includes a rating indicating its impact upon performance of the document, and determining whether the subset of the set of configured fine print data structures comprises an optimal set of fine print data structures for the document is based on the rating of each fine print clause data structure in the subset of the set of fine print data structures. Additionally or alternatively, the method may further include transmitting an indication of whether the subset of the set of configured fine print data structures comprises an optimal set of fine print data structures for the document. As yet another additional or alternative feature, the method may include, in an instance in which the subset of the set of configured fine print data structures does not comprise an optimal set of fine print data structures for the document, generating, by the processor, a recommended modification to the subset of the set of fine print data structures, and transmitting an indication of the recommended modification.

In another example embodiment, a computer program product is provided for improved utilization of fine print for a document. The computer program product comprises a computer-readable storage medium storing computer program code that, when executed by an apparatus, causes the apparatus to receive, from a developer device, information identifying a location and a domain associated with the document, identify, based on the received location and domain, a set of fine print clause data structures relevant to the location and the domain, wherein each particular fine print clause data structure in the set includes a field defining a categorization of that particular print clause data structure, transmit an indication of the set of identified fine print clause data structures to the developer device, receive, from the developer device and in response to transmission of the set of identified fine print clause data structures, an indication of a selection of a subset of the set of fine print data structures, and cause generation of a visual representation of the document that displays fine print clauses corresponding to the subset of the set of fine print data structures, wherein the location of the fine print clauses in the visual representation is based on the categorization of the fine print clause data structures corresponding to the fine print clauses.

In some embodiments, identifying the set of fine print clause data structures relevant to the location and the domain comprises searching the memory for one or more mapping data structures associated with the received location and domain, receiving search results comprising the one or more mapping data structures, and retrieving fine print clause data structures identified within the one or more mapping data structures, wherein the relevant fine print clause data structures comprise the retrieved fine print clause data structures.

In some embodiments, the computer program code, when executed by the apparatus, further causes the apparatus to retrieve, from the one or more mapping data structures and for each fine print clause data structure in the set of fine print clause data structures, presentation information indicating whether a fine print clause associated with the fine print clause data structure should be shown to a user for selection, should be pre-selected for inclusion in the promotion, or is required for the promotion, wherein transmitting the indication of the set of identified fine print clause data structures to the developer device includes transmitting the presentation information.

In some embodiments, at least one fine print clause data structure from the set of fine print clause data structures includes a configurable text data structure, and the indication of selection of the subset of the set of configured fine print data structures further indicates a selection of text for the configurable text data structure.

In some embodiments, the computer program code, when executed by the apparatus, further causes the apparatus to determine whether the subset of the set of configured fine print data structures comprises an optimal set of fine print data structures for the document. In some such embodiments, each fine print clause data structure includes a rating indicating its impact upon performance of the document, and determining whether the subset of the set of configured fine print data structures comprises an optimal set of fine print data structures for the document is based on the rating of each fine print clause data structure in the subset of the set of fine print data structures. Additionally or alternatively, the computer program code, when executed by the apparatus, may further cause the apparatus to transmit an indication of whether the subset of the set of configured fine print data structures comprises an optimal set of fine print data structures for the document. As yet another additional or alternative feature, the computer program code, when executed by the apparatus, further causes the apparatus to in an instance in which the subset of the set of configured fine print data structures does not comprise an optimal set of fine print data structures for the document, generate a recommended modification to the subset of the set of fine print data structures, and transmit an indication of the recommended modification.

In another example embodiment, an apparatus is provided for dynamically updating fine print clause data structures to incorporate rating information. The apparatus includes communications circuitry configured to receive a fine print clause data structure having a globally unique identifier (GUID), clause rating circuitry configured to query a historical database using the GUID of the fine print clause data structure to retrieve previously generated documents that include the fine print clause data structure, and rate a performance impact of the fine print clause data structure using the previously generated documents, and a memory configured to store the rating in the fine print clause data structure.

In some embodiments, rating the performance impact of the fine print clause data structures comprises evaluating success of the previously generated documents that include the fine print clause data structure, calculating a significance of the fine print clause data structure to the success of the previously generated documents, and generating the rating based on the calculated significance.

In another example embodiment, a method is provided for dynamically updating fine print clause data structures to incorporate rating information. The method includes receiving a fine print clause data structure having a globally unique identifier (GUID), querying a historical database, by clause rating circuitry of a server device and using the GUID of the fine print clause data structure, to retrieve previously generated documents that include the fine print clause data structure, rating, by the clause rating circuitry, a performance impact of the fine print clause data structure using the previously generated documents, and storing the rating in the fine print clause data structure.

In some embodiments, rating the performance impact of the fine print clause data structures comprises evaluating success of the previously generated documents that include the fine print clause data structure, calculating a significance of the fine print clause data structure to the success of the previously generated documents, and generating the rating based on the calculated significance.

In another example embodiment, a computer program product is provided for dynamically updating fine print clause data structures to incorporate rating information. The computer program product comprise a computer-readable storage medium storing computer program code that, when executed by an apparatus, causes the apparatus to receive a fine print clause data structure having a globally unique identifier (GUID), query a historical database, using the GUID of the fine print clause data structure, to retrieve previously generated documents that include the fine print clause data structure, rate a performance impact of the fine print clause data structure using the previously generated documents, and store the rating in the fine print clause data structure.

In some embodiments, rating the performance impact of the fine print clause data structures comprises evaluating success of the previously generated documents that include the fine print clause data structure, calculating a significance of the fine print clause data structure to the success of the previously generated documents, and generating the rating based on the calculated significance.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings, which are not necessarily drawn to scale.

Figure 1:
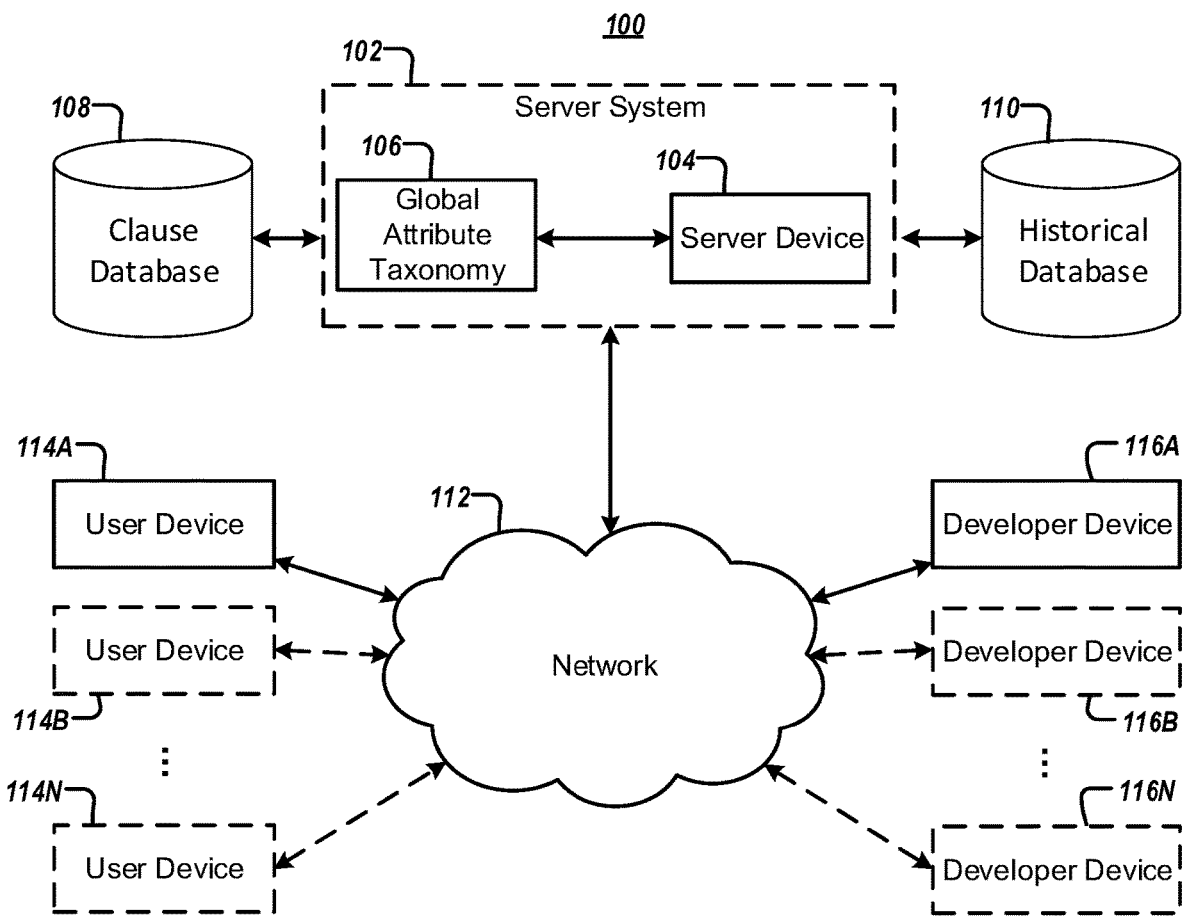

FIG. 1 illustrates an example system within which embodiments of the present invention may operate.

Figure 2:
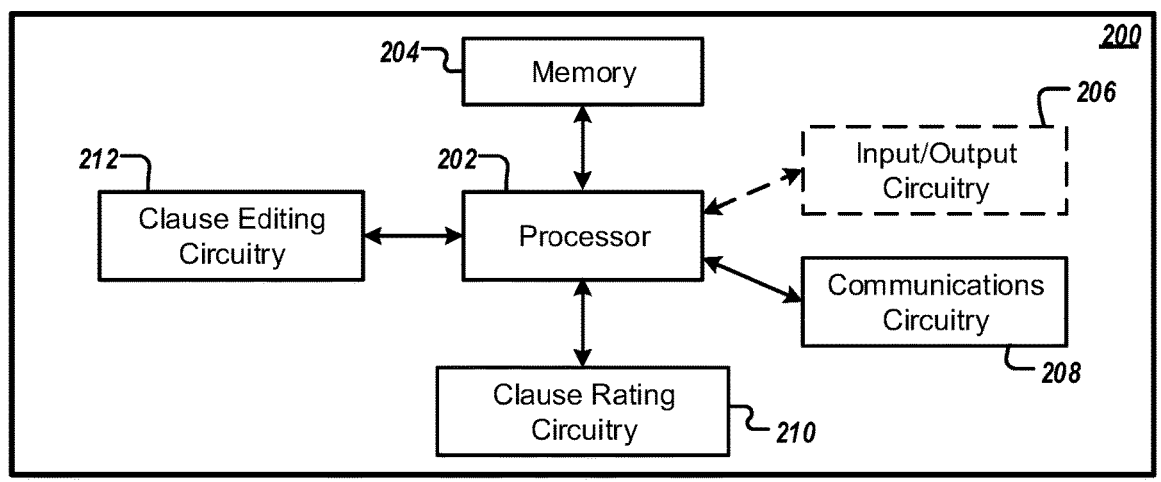

FIG. 2 illustrates a block diagram showing an example server device that may be included in a server system, in accordance with some example embodiments described herein.

Figure 3:
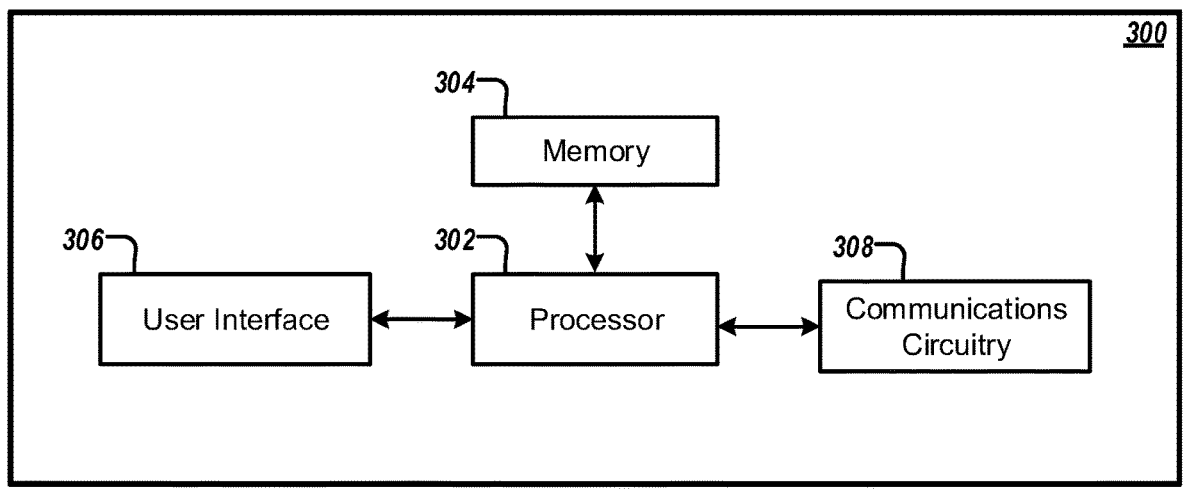

FIG. 3 illustrates a block diagram showing an example device for use by a user or fine print developer, in accordance with some example embodiments described herein.

FIG. 4A illustrates a block diagram of an example fine print clause data structure, in accordance with some example embodiments described herein.

FIG. 4B illustrates a block diagram of an example mapping data structure, in accordance with some example embodiments described herein.

FIG. 4C illustrates a block diagram of an example configurable text element for use in a fine print clause data structure, in accordance with some example embodiments described herein.

Figure 5:
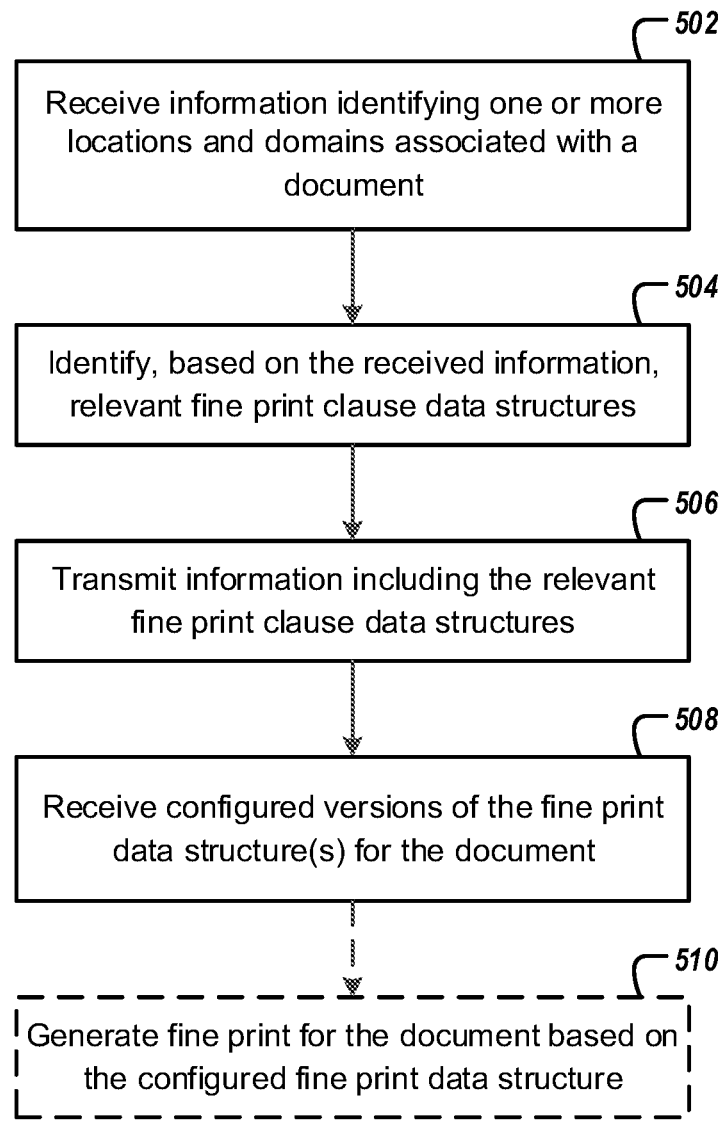

FIG. 5 illustrates a flowchart describing example operations for generating fine print for a document, in accordance with some example embodiments described herein.

Figure 6A:
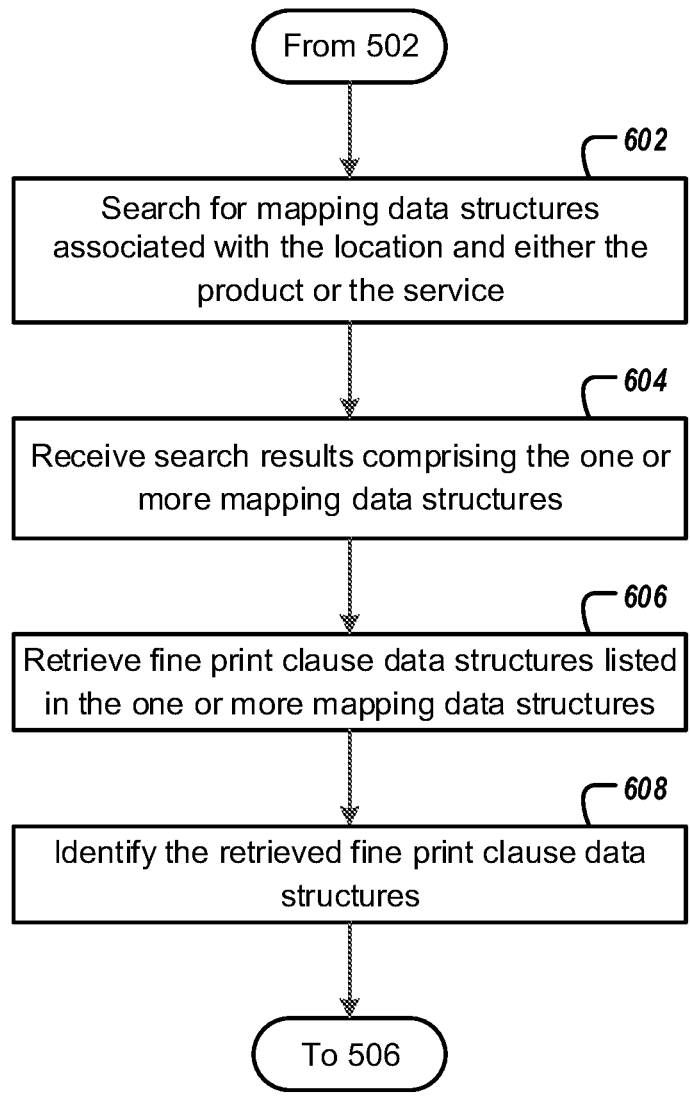

FIG. 6A illustrates a flowchart describing additional example operations for generating fine print for a document, in accordance with some example embodiments described herein.

Figure 6B:
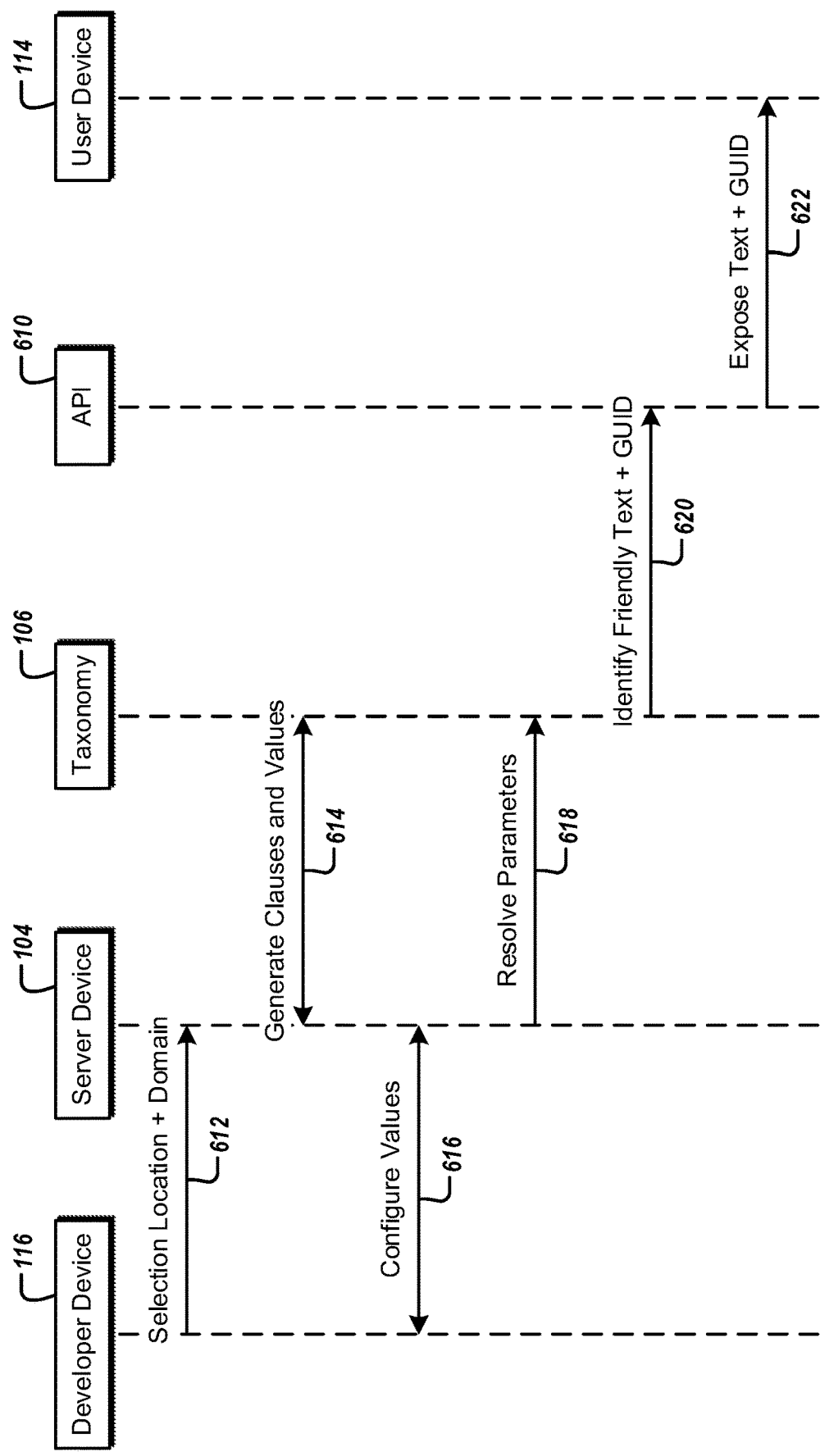

FIG. 6B illustrates a swim-lane diagram illustrating an operational flow for generating fine print for a document, in accordance with some example embodiments described herein.

Figures 6C, 6D, 6E:
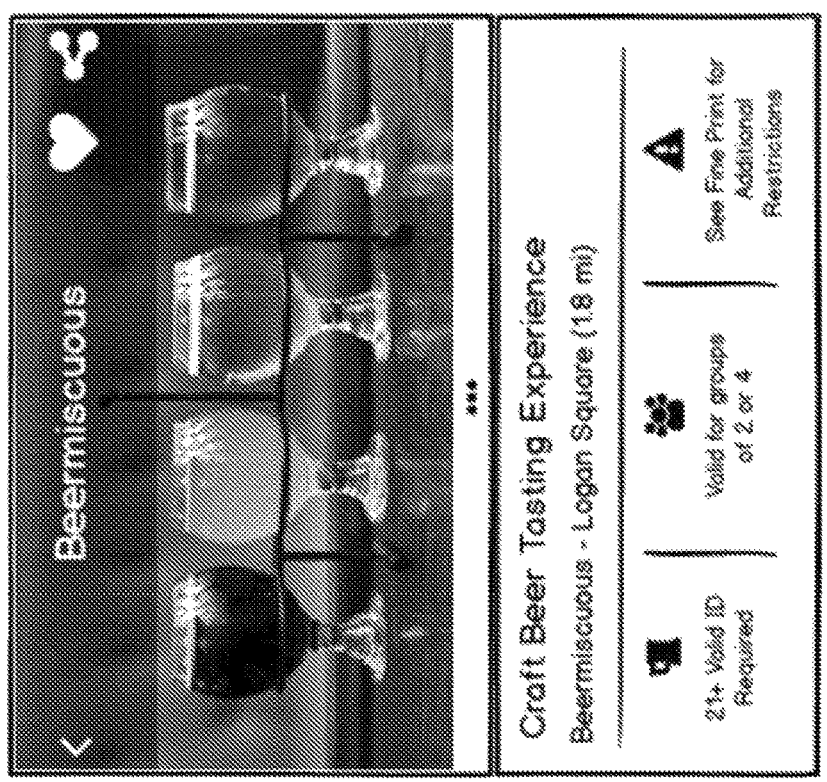

FIGS. 6C-6E illustrate alternative fine print clause display designs, in accordance with some example embodiments described herein.

FIGS. 7A-7L illustrate example user interfaces facilitating selection of fine print by a fine print developer, in accordance with some example embodiments described herein.

Figure 8:
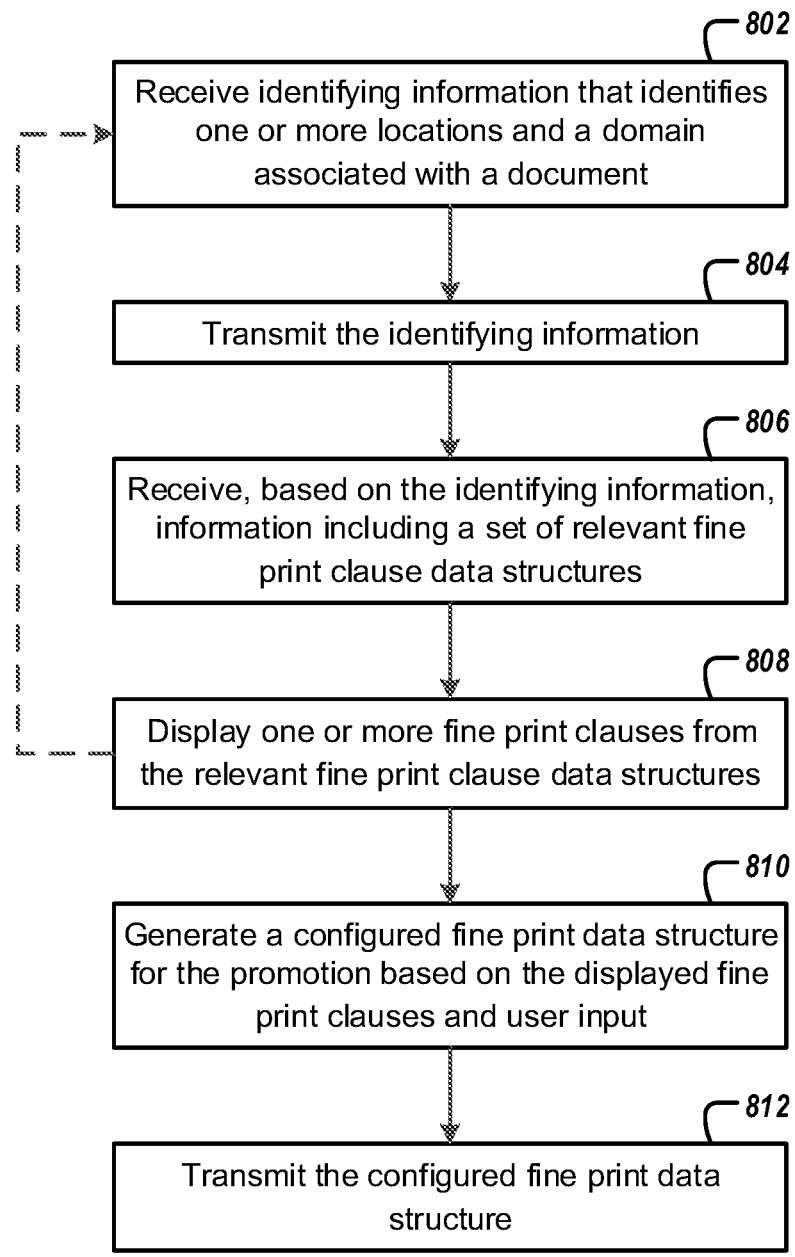

FIG. 8 illustrates a flowchart describing example operations for generating fine print for a document from the perspective of a fine print developer, in accordance with some example embodiments described herein.

Figure 9:
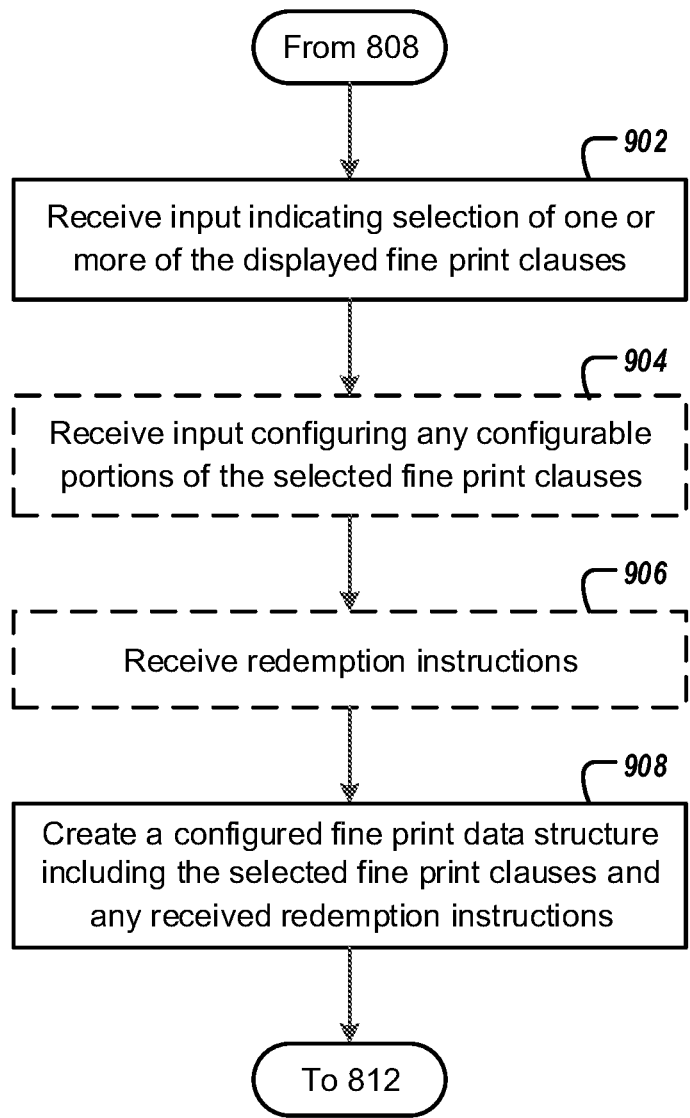

FIG. 9 illustrates a flowchart describing additional example operations for generating fine print for a document from the perspective of a fine print developer, in accordance with some example embodiments described herein.

Figure 10:
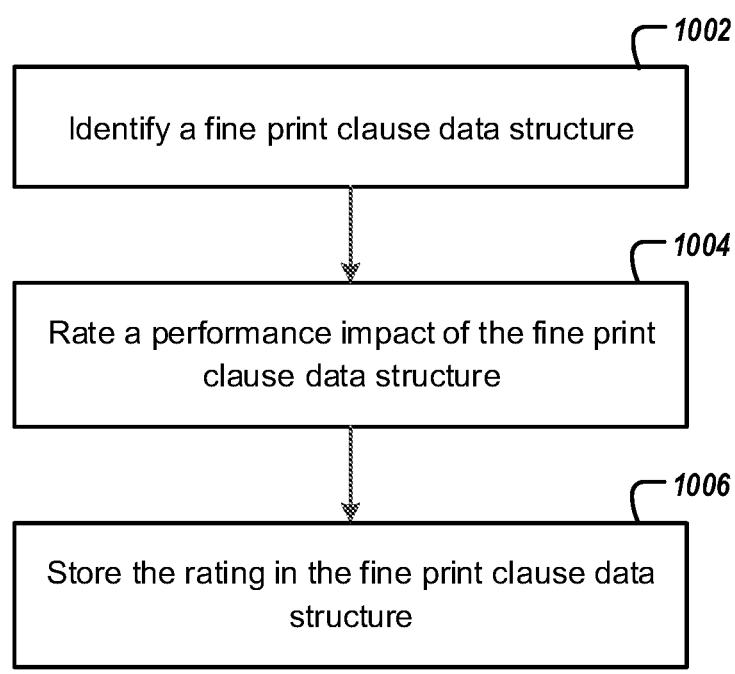

FIG. 10 illustrates a flowchart describing example operations for dynamically generating ratings for fine print clause data structures, in accordance with some example embodiments described herein.

Figure 11:
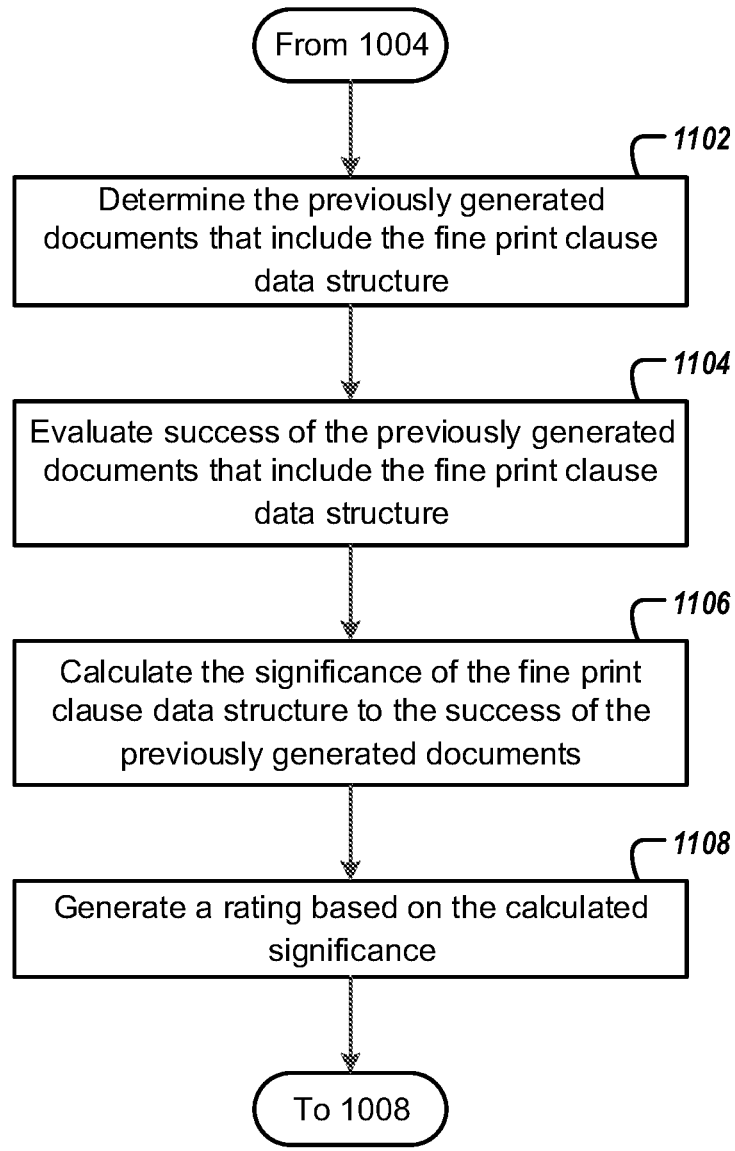

FIG. 11 illustrates a flowchart describing additional example operations for evaluating success and generating ratings for particular fine print clause data structures, in accordance with some example embodiments described herein.

FIGS. 12A-12E illustrate example user interfaces for improving the set of fine print selected for a document based on rating information, in accordance with some example embodiments described herein.

Figure 13:
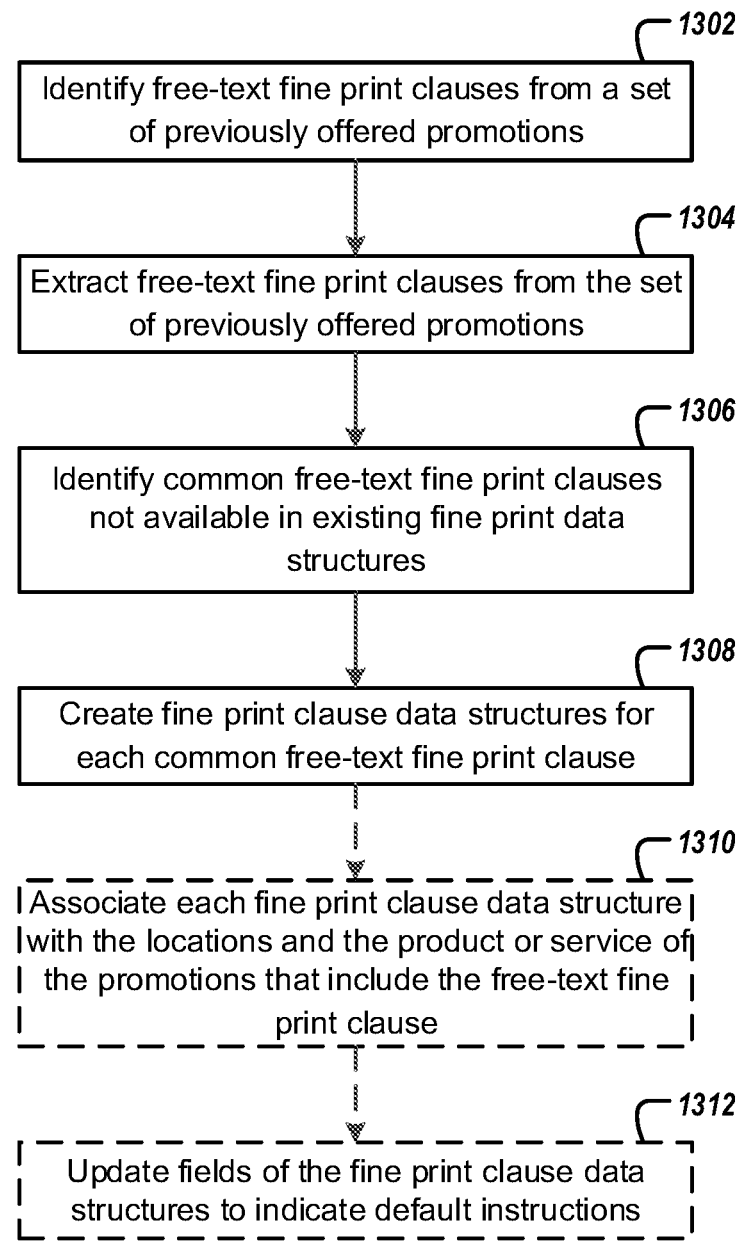

FIG. 13 illustrates a flowchart describing example operations for automated creation of fine print clause data structures, in accordance with some example embodiments described herein.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "fine print developer" refers to any party that generates and/or modifies documents with which fine print is associated. For instance, a fine print developer may be a business owner, tradesperson, vender, operator, entrepreneur, agent, dealer, organization or the like that is in the business of a providing a good, service or experience to a consumer. One example fine print developer may be a running company that generates documents promoting sales and/or events related to running.

As used herein, the term "fine print" refers to parameters (legal or contractual), restrictions, or other considerations that outline any term, timing, constraints, or limitations, that regard the rights of an end-user to use a document. In this regard, fine print may thus include limitations on liability, conditions for eligibility, blackout dates, "blacklistings" (groups not approved to use or gain benefit from the document), "whitelistings" (groups expressly approved to user and/or otherwise gain some benefit from the document), or any other notification that a fine print developer may desire to place on a document. For example, using the aforementioned running company as an example fine print developer and a promotion offered by the running company as a document with which fine print is associated, examples of the fine print may be: a limit of one purchase per person, a restriction on the physical store locations at which redemption is allowed, a set of end-users who may utilize the document, a set of end-users who may not utilize the document, a set of blackout dates during which the document may not be used, or the like.

Overview

A method, apparatus, and computer program product are provided in accordance with an example embodiment of the present invention in order to improve the generation and utilization of fine print for documents.

When interacting with large numbers of end-users across the world, organizations must become increasingly sensitive to the variety of types, detail, and content of fine print included in documents exchanged with such individuals. For instance, when a global platform offers promotions to end-users on behalf of a wide variety of merchants, it becomes increasingly important to ensure flexibility regarding the types of fine print that may be included in any given promotion. Historically, individuals have manually developed and prepared the fine print for such documents. However, there are several drawbacks of this manual method for generating fine print in documents.

For instance, human error can always cause problems. Even the most attentive individual will occasionally make inadvertent typographical or grammatical errors, which can render the fine print ambiguous or unclear. Moreover, such errors present a monetary risk, such as when the fine print accidentally authorizes windfall returns to one party or another.

In the case of fine print used for promotions, when a sales representative manually develops fine print for a promotion based on an interaction with a merchant, there exists a chance that some part of the merchant's intent during the interaction will get lost, and will therefore not be captured by the fine print that the sales representative eventually develops. Moreover, even if the merchant's intent is captured, by developing fine print manually, the fine print that eventually is drafted may often be worded differently from the language desired by the merchant, and small changes in language may have large effects on the rights of the parties governed by the promotion and the likelihood of engagement by end-users. As a result, consumers who purchase such promotions may be driven to seek refunds for purchased promotions, rather than redeeming the promotions for products and services at merchant locations. Not only do refund requests tarnish the brand of both the merchant and global platform while reducing profits, but refund requests can reduce the value of the promotion to merchants, thereby driving some amount of future business away from the global platform.

These same problems generalize to other environments as well. When documents are generated having ambiguous or unclear fine print, or fine print that does not track well with the needs or desires of one or another party associated with the document, there is a direct threat to the credibility and market position of the individual or organization generating the document and its associated fine print.

Accordingly, to surmount these problems, example embodiments of the present invention are shown for generating fine print that is more robust, efficiently created, better captures fine print developer intent, and improves the clarity of fine print for end-users. In some example embodiments, a global attribute taxonomy is utilized to improve the structuring and classification of fine print clause data structures. The fine print clause data structures encapsulate the universe of potential fine print clauses that may be used in a typical document, and selection of fine print clause data structures by a fine print developer is guided by the hierarchy set enforced through use of the global attribute taxonomy. In this regard, the fine print clause data structures may be categorized into location, contractual right, or marketing categories, and can therefore be sorted and displayed to end-users based on these categorizations. The fine print clause data structures may also, of course, be associated with particular domains (e.g., for a promotion, this may be particular products or services) within which they are expected to be used, which facilitates initial development of a set of fine print clauses for a given document.

Accordingly, an end-user or fine print developer, when interacting with the server system, may create fine print for a document using an intuitive user interface to select and configure relevant fine print clauses, and this fine print may be organized for visual display in an intuitive and user-friendly fashion. By standardizing the fine print clauses that may be selected and improving the friendliness of the way fine print is displayed on documents, the server system service is able to improve the consistency of the fine print deployed, improve the experience of fine print developers due to the speed with which the fine print can be created, and improve the experience of end-users interacting with the produced documents. In other words, example embodiments accordingly set forth meaningful improvements improving the ease of use and quality of result provided by the organization facilitating generation of fine print.

Moreover, by utilizing the logical architecture described herein, additional add-on improvements are also possible. For instance, the server system can recommend specific fine print clauses or sets of fine print clauses based on an analysis of the structured documentation associated with a historical database of documents that have previously used various fine print clauses. Accordingly, example embodiments described herein facilitate an improved self-service model for fine print generation that can add value in a more rigorous fashion than an individual who would otherwise assist a fine print developer in generating appropriate fine print for a document. Example embodiments of the present invention thus enhance the fine print developer experience by reducing the degree of reliance upon sales representatives that otherwise may exist. In addition, due to the configurability of the fine print clause data structures described below, example embodiments of the present invention provide a way to maintain the flexibility and modifiability of traditional methods for manually generating promotion fine print while automating and expediting the fine print generation process.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. End users and fine print developers may access a server system 102 via a network 112 (such as the Internet, or the like) using computer devices 114A through 114N and 116A through 116N, respectively. Moreover, the server system 102 may comprise a server device 104 in communication with a global attribute taxonomy 106. The server system may further have access to a clause database 108 that stores fine print clause data structures and mapping data structures, and a historical database 110 storing historical information regarding previously generated documents and their associated fine print. The server system 102 is, in some examples, able to generate, deploy, and/or update fine print clause data structures, as will be described below.

The server device 104 may be embodied by a computing system, such as apparatus 200 shown in FIG. 2. As illustrated in FIG. 2, the apparatus 200 may include a processor 202, a memory 204, input/output circuitry 206, communications circuitry 208, clause rating circuitry 210, and clause editing circuitry 212, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications circuitry 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The clause rating circuitry 210 may be used to calculate ratings for fine print clause data structures, as well be described in greater detail below. The ratings may comprise an estimate of the impact of the fine print clause data structure on the performance of a promotion in which the fine print is included. The ratings may be based on an analysis of previously offered promotions stored in historical database 110. Moreover, upon expiration of a promotion, the clause rating circuitry 210 may update ratings for the fine print clause data structures used in the promotion, taking into account the additional data gathered from the expired promotion. As a result, the clause rating circuitry 210 is able to dynamically update the fine print clause data structures and mapping data structures in a way that ensures that the most accurate and relevant fine print is suggested to sales representatives, merchants, or other promotion creator in view of the latest performance metrics.

The clause editing circuitry 212 may be used to create and revise fine print clause data structures, as well as mapping data structures, used in embodiments of the present invention. The clause editing circuitry 212 may generate new fine print clause data structures by evaluating previously offered promotions and identifying fine print clauses that may be relevant to future promotions. The clause editing circuitry 212 may also revise existing fine print clause data structures in view of revised clause ratings determined by the clause rating circuitry 210. Finally, the clause editing circuitry 212 may create and revise mapping data structures, which document relationships between products, services, and locations at which promotions may be redeemed.

In one embodiment, a fine print developer may use the apparatus 200 to generate promotion fine print in accordance with example embodiments of the invention. However, in other embodiments, a fine print developer may interact with the server system 102, from a developer device 116. End users may interact with the documents containing the generated fine print via user devices 114A-114N.

Referring now to FIG. 3, a block diagram is illustrated showing an example apparatus 300 that may be configured to enable a fine print developer to generate fine print from outside the server system 102 or which may enable a user to interact with a generated document, in accordance with some example embodiments described herein.

In FIG. 3, the apparatus 300, which may embody user device 114 or developer device 116, may include or otherwise be in communication with a processor 302, a memory 304, a user interface 306, and a communications circuitry 308. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

The user interface 306 that may, in turn, be in communication with processor 302 to provide output to the user and, in some embodiments, to receive an indication of a user input. As such, the user interface may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications circuitry 308 may be any means such as a device or circuitry embodied in either hardware or a combination of hardware and software that is configured to receive and/or transmit data from/to a network and/or any other device or circuitry in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Data Structures

To enable fine print developers (e.g., sales representatives, merchants, or other entities interacting with the server system) to select and configure fine print, some example embodiments involve the use of fine print clause data structures stored in global attribute taxonomy 108. The fine print may be intended for any sort of documents, examples of which include purchase agreements, employment agreements, barter systems, general contractual arrangements, or any other implementation in which fine print may have a meaningful implication on the various rights and duties of the parties. Each fine print clause data structure includes a field holding its associated fine print clause, as well as additional fields for other information relating to the clauses, as show in FIG. 4A.

FIG. 4A illustrates an example block diagram representing various elements that may be included in a fine print clause data structure. In this regard, each fine print clause data structure may include a globally unique identifier (GUID) 402, representing a key by which the fine print clause data structure may be queried and/or easily associated, using a mapping data structure (described below) with other data stored in clause database 108. In addition, the fine print clause data structure may include a fine print clause field 404 that stores a configurable text data structure comprising static text and any configurable elements within the particular fine print clause. As will be described in greater detail below in connection with FIG. 4C, some or all of the text in the fine print clause field 404 may be configurable. In addition, the fine print clause data structure may further include a help field 406 that stores help text, which describes the meaning of the fine print clause represented by the fine print clause data structure (the meaning or implications of the configurable text data structure may not easily be intuitively understood when read out of context). When initially generating fine print for a document, the fine print developer may be presented with a user interface (including, for instance, any of those shown in FIGS. 7A-7L) facilitating selection of one or more fine print clauses. Mousing over any given clause presented via a user interface may generate a pop-up message box providing the help text retrieved from the help text field 406 of the corresponding fine print clause data structure to provide useful descriptive information to fine print developers at the time of fine print generation.

In addition, each fine print clause data structure further includes a categorization field 408 defining the type of fine print clause that is represented by the fine print clause data structure. For instance, the categorization field 408 may indicate that the fine print clause comprises either a "place" clause, a "contract" clause, or a "marketing" clause. Place clauses are those attributes describing characteristics of a physical location that are unchanged from document to document. Some examples might be indications of whether a given location provides Wi-Fi, whether it accepts credit cards, the identity of a service provider at that location, standing hours of operation, whether there is indoor and/or outdoor seating at the location, whether the location accepts reservations, or the like. Contract clauses are those attributes that can vary even within a particular location and that instead are specific to the particular contractual terms of the document. Some examples might regard legal age restrictions (e.g., that one must be 21 years old to enter a bar), item attributes offered (a "Special Swedish Massage"), or the like. Finally, marketing clauses are those attributes describing features of a document that are not place-specific or contractual in nature. For example, these might be clauses such as "Good for Kids", "Romantic", a description of seasonality (e.g., "great winter activity"), Holiday-related clauses, or the like. By including a categorization field in the fine print clause data structure, it is possible to produce a granular analysis of specific types of fine print. Moreover, by including this categorization field, example embodiments thereafter are configured to automatically depict different fine print clauses in distinct category-specific portions of the document, thus unlocking the ability to produce a more logical and user-friendly display of the various fine print clauses to an end-user.

As shown in FIG. 4A, the data structure may also include up to three additional fields that are relevant to initial selection of fine print clauses for a document and that designate the default settings for selection of the fine print clause data structure. These default fields include a "Show-By-Default" field, a "Select-By-Default" field, and a "Required-By-Default" field. The default fields indicate default rules for configuring the fine print for a given document in the absence of the receipt of specific contrary rules from a mapping data structure, as will be described in greater detail below. If the "Show-By-Default" field is true, then the fine print clause stored in the data structure will be shown to the fine print developer for selection upon initial generation of fine print for a document. If the "Select-By-Default" field is true, then the fine print clause stored in the data structure will be shown to the user for selection, but will also be automatically selected, and therefore will be included in the fine print for the promotion unless the user specifically deselects the fine print clause. If the "Required-By-Default" field is true, then the fine print clause stored in the data structure will be shown to the user, will be selected for inclusion in the fine print for the promotion, and will not be de-selectable.

Optionally, the fine print clause data structure may also include a numerical rating field that indicates an estimated impact of the fine print clause on the document, as calculated by the clause rating circuitry 210. In some embodiments, the prominence (e.g., the size, location, font, color, or the like) of the fine print clause in the user interfaces 7A-7L presented to the user may vary and/or change based on the value in the rating field.

Turning now to FIG. 4B, a representation of a mapping data structure is illustrated that can be used in some embodiments for identifying which fine print clause data structures to present in a user interface to a fine print developer who is selecting fine print for a document. As with the fine print clause data structure, each mapping data structure includes a GUID 410. Furthermore, the mapping data structure includes a domain field 412, which includes the domain(s) to which the mapping is associated. When the document is a promotion, the domain field 412 may indicate the products and/or services to which the mapping data structure is associated. The mapping data structure further includes a location field 414, which specifies the location(s) within which the required/selected/shown field applies for a given clause. In one embodiment, a mapping for a specific location overrides a mapping for a more general location. For example: Mapping 1 specifies that Clause A for Service 1 is required in all locations. Mapping 2 specifies that Clause A for Service 1 is available (but not required) in Illinois. Outside of Illinois, Mapping 1 would be the rule. Inside Illinois, Mapping 2 would take precedence.

The mapping data structure further includes a clauses field 416, which lists all of the fine print clause data structures 402A to 402N that are allowable for the combination of the domain and location(s) in the mapping data structure. For each fine print clause data structure 402 in the clauses field, the mapping additionally includes fields "Show," "Selected," and "Required" that, if non-empty, comprise rules that override the default values stored in the respective default fields of the fine print clause data structure. Accordingly, the server system 102 may use the mapping data structure to quickly identify potential fine print clause data structures for potential use in a document based on the domain and the possible locations where the document may be relevant.

Turning now to FIG. 4C, a representation of an example configurable text data structure is illustrated. An instance of a configurable text data structure may be referenced in the fine print clause field 404 of a given instance of a fine print clause data structure. The configurable text data structure is used to design a specific configuration of a standardized fine print clause associated with the fine print clause data structure, and can be modified by the fine print developer via a user interface (e.g., user interface 306, or the like). Each configurable text data structure includes a GUID 418 to facilitate referencing and/or querying of the specific configuration of the standardized fine print clause. In addition, each configurable text data structure includes an interface type, which indicates the manner in which the data in the configurable text data structure should be displayed for selection by a fine print developer (e.g., as a text box or a dropdown menu) via a user interface (e.g., those shown in FIGS. 7A-7L) during generation of fine print for a document. Furthermore, each configurable text data structure may include a selection type indicating the type of data that is enterable by a fine print developer during configuration of the fine print clause data structure. This selection type may be, for instance, an Integer, a Range, a DateTime field, or the like. In addition, each configurable text data structure may further include a field comprising standard text that is not intended to change between instances of the configurable text data structure, and which is thus not modifiable.

If the interface type of a configurable text data structure is a text box, the configurable text data structure may further include a field defining default text that is pre-selected for the modifiable portion of the configurable text data structure (e.g., this default text comprises the text that will appear upon initial display of the associated fine print clause to a fine print developer) and in some embodiments may further include a regular expression (regex) validation field, which controls the manner by which the configurable text may be modified. For example, in an example in which the fine print clause recites "Limit <property name='purchase_limit_per_person'>1</> per person," the default text is "1" and the regex validation field restricts input to any whole number greater than one. Accordingly, the default text can be replaced with any whole number greater than one without violating the regex validation field.

The configurable text type may alternatively instruct use of a dropdown menu. In this case, the configurable text data structure includes a series of values 420A to 420N, as well as a default value that is initially pre-selected for display. Each value 420 includes fields storing dropdown text that will be shown within the dropdown menu, and fine print text that will populate the fine print clause if the corresponding dropdown text is selected from the dropdown menu.

Using configurable text data structures within fine print clause data structure, the server system is able to transmit to a user a series of configurable fine print clauses, while still enforcing rules upon the nature of the configurations allowed. Moreover, by utilizing both fine print clause data structures and configurable text data structures having individual GUIDs, granular manipulation of the data structures and querying functionality are possible even after generation of fine print (functions not possible when in embodiments in which fine print is generated as a text block).

Operations for Fine Print Generation

Turning now to FIGS. 5 and 6, example operations for generating fine print for a document are illustrated from the perspective of a server system 102. The operations illustrated in FIGS. 5 and 6 may, for example, be performed by the server system 102 (e.g., server device 104), with the assistance of, and/or under the control of one or more devices, such as apparatus 200, and may use processor 202, memory 204, input/output circuitry 206, and communications circuitry 208.

In operation 502, the apparatus 200 includes means, such as input/output circuitry 206, communications circuitry 208, or the like, for receiving information identifying one or more locations and domains associated with a document. If the document comprises a promotion, this information may identify locations at which a customer may redeem a promotion and either a product or a service associated with the promotion. This information is likely received from a user device 114 or a fine print developer device 116 and via a network 112, as illustrated in FIG. 1. However, in some embodiments, this information may be received by direct user input using input/output circuitry 206, or from analysis of historical documents retrieved from historical database 110, or review of stored fine print clause data structures retrieved from clause database 108.

In operation 504, the apparatus 200 includes means, such as processor 202 or the like, for identifying, based on the received information, relevant fine print clause data structures. Using an example document comprising a promotion for a food and drink meal at a five star restaurant location, a relevant fine print clause data structure may include a clause regarding suitable attire, which may not be relevant for a promotion regarding a baseball game. Similarly, a fine print clause data structure may be relevant for a promotion for skydiving, while not relevant for a promotion for a discount on ice cream. In other examples, a promotion related to a nightclub may have an age restriction, where a travel promotion may include blackout dates. This identification operation is described in greater detail below in connection with FIG. 6.

In one embodiment, at least one fine print clause data structure includes configurable text, such as by referencing a configurable text data structure described above with respect to FIG. 4C. In another embodiment, each identified fine print clause data structure includes fields indicating default instructions regarding whether an associated fine print clause is required for the promotion, selected for inclusion in the promotion, or should be shown to a user for selection. In yet another embodiment, each fine print clause data structure includes a rating indicating an impact upon promotion performance. In this regard, the rating may be calculated based on the historical performance of previously offered promotions, as described below in connection with FIGS. 10 and 11.

Turning now to FIG. 6, a more detailed set of example operations are shown for identifying relevant fine print clause data structures. As with the FIG. 5, the operations illustrated in FIG. 6 may, for example, be performed by the server system 102 (e.g., server device 104), with the assistance of, and/or under the control of one or more devices, such as apparatus 200, and may use processor 202, memory 204, input/output circuitry 206, and communications circuitry 208.

In operation 602, the apparatus 200 includes means, such as processor 202, memory 204, clause database 108, or the like, for searching for mapping data structures associated with the location and domain received above in operation 502. In this regard, mapping data structures may be stored in clause database 108, and therefore may be dynamically accessed by server system 102 without additional user involvement.

In operation 604, the apparatus 200 includes means, such as memory 204, input/output circuitry 206, or clause database 108, for receiving search results comprising one or more mapping data structures.

Subsequently, in operation 606, the apparatus 200 includes means, such as input/output circuitry 206, communications circuitry 208, or the like, for retrieving fine print clause data structures identified in the one or more mapping data structures. In this regard, as described above in connection with FIG. 4B, each mapping data structure includes a list of associated fine print clause data structures that may be readily identified by querying the respective fields of the mapping data structures. In some embodiments, this operation further includes retrieving from the one or more mapping data structures, for each fine print clause data structure, presentation information indicating whether the fine print clause associated with the fine print clause data structure is required for the document, should be selected for inclusion in the promotion by default, or should be shown to a user for selection.

In operation 608, the apparatus 200 includes means, such as processor 202, or the like, for identifying the retrieved fine print clause data structures.

Returning to FIG. 5, in operation 506, the apparatus 200 includes means, such as input/output circuitry 206, communications circuitry 208, or the like, for transmitting information including the relevant fine print clause data structures identified in operation 504. Accordingly, in embodiments in which presentation information is retrieved in operation 606, the information transmitted may include the presentation information. In this regard, the transmitted presentation information may include the presentation information for each fine print clause data structure. Although in many embodiments information is transmitted to the device from which information is received in operation 602, return transmission is not a necessity, and the identified relevant fine print clause data structures may be transmitted to another device (e.g., if the information is received from a merchant terminal 116, the fine print clause information may be transmitted to a sales representative terminal 114, or vice versa).

In operation 508, the apparatus 200 includes means, such as input/output circuitry 206, communications circuitry 208, or the like, for receiving configured versions of a subset of the fine print clause data structures transmitted in operation 506. In this regard, the creation of a configured version of a fine print clause data structure is discussed below in connection with FIGS. 7, 8, and 9.

Finally, in operation 510, the apparatus 200 may optionally include means, such as processor 202, or the like, for generating fine print for the document using the configured versions of the fine print clause data structures. In some embodiments, the fine print can be extracted from the configured versions of the fine print clause data structures and collated into a fine print string included for inclusion within the document. An example of this string-based presentation model is illustrated in FIG. 6C, which shows a block of text. However, in other embodiments described below in connection with FIG. 6B, the structured nature of the selected fine print facilitates more complex presentations of the fine print that can be dynamically generated and displayed when an end user views the document (e.g., the fine print can be organized into various arrangements to suit specific goals, as shown in FIGS. 6D and 6E, respectively).

Accordingly, dynamic generation of fine print unlocks features ensuring that the fine print included in a document is more user friendly, has improved clarity, and/or is conveyed in a manner that improves reception of the fine print when compared to presenting the fine print as a simple string of text.

The operations illustrated in FIG. 6B may thus represent an example process flow for generating a document, selecting fine print, and displaying fine print dynamically using example embodiments described herein.

Starting first at operation 612, the fine print developer may, via developer device 116, select the location(s) and domain making up the document. In the example where the document comprises a promotion, this operation may include selection of the product or service being promoted as well as a location (or multiple locations) where the product or service may be redeemed.

At operation 614, the sever device 104 may interact with the global attribute taxonomy 106 to generate a series of fine print clause data structures relevant to the identified location(s) and domain, and may further identify a series of values that are applicable for any of the configurable text associated with one or more of the generated fine print clause data structures.

At operation 616, the server device 104 may then interact with the developer device 116 to present to the fine print developer a series of user interfaces facilitating configuration of the fine print via selection of particular fine print clause data structures to use as well as selection of values to utilize that are configurable within any selected fine print clause data structures.

Subsequently, at operation 618, the server device may query the global attribute taxonomy 106 to resolve specific parameters corresponding to each selected fine print clause data structures and, at operation 620, may provide to an application programming interface (API) call only the "friendly text" that comprises a string storing the fine print clause for display (e.g., with any variable fields embedded therein as text), along with the GUID corresponding to the fine print clause data structure and/or the GUID corresponding to the underlying configurable text data structure. In doing so, this resolution dramatically simplifies the taxonomy by removing the need to generate a 1:1 GUID to text string match to enable downstream clients (e.g., end-user devices) to render fine print clauses corresponding to fine print clause data structures.

Finally, as shown at operation 622, the user device 114 may then expose the fine print text to an end-user via a user interface, while retaining the GUID corresponding to the structured data representative of the fine print clause text itself. In this regard, having access to the GUID of the structured data facilitates the utilization of a variety of fine print presentation options by the user device 114. For instance, a simple display may simply illustrate the fine print clause text in a basic string form, as shown in FIG. 6C. However, more complex displays are possible that categorize the fine print clauses based on the categorization fields in their corresponding fine print clause data structures, which can be retrieved using the GUID received in connection with the friendly text corresponding sourced from each fine print clause data structure. As shown in FIG. 6D, the fine print may be organized into bulleted sections based on categorization of the corresponding fine print clause data structures. Similarly, as shown in FIG. 6E, the fine print may be organized into regions associated with particular graphical illustrations, such as icons, that present a more user-friendly visual appeal.

Another feature included in some embodiments contemplated herein is the ability to automatically generate and display permissive fine print clauses designed to offset the negative impact of certain selected fine print clauses, or to automatically display a blank fine print region (in which the set of fine print clauses comprises a null state) in place of any fine print clauses having a particularly negative impact. In this regard, permissive fine print may be displayed in response to selection of restrictive fine print, but if no restrictive fine print has been selected, then the null field may be displayed (although in some embodiments, permissive fine print may be displayed nevertheless). As a result, embodiments can offer a separate display outcome (a blank fine print region) when permissive fine print is not needed. For instance, as shown in FIG. 6E, one fine print clause illustrates the requirement "21+ Valid ID Required". Research suggests that many fine print clauses that place restrictions and/or limitations on the use or benefits that may be derived from a document can limit the end-user interest in the document. Accordingly, to offset the restrictive tone of this fine print clause, another area of the document may introduce a permissive fine print clause generated by the server system, fine print developer device, or the like, highlighting an aspect of the document that does not include a restriction. For instance, although one must be 21 years old to redeem the example promotion shown in FIG. 6E, the promotion shown in FIG. 6E could in some embodiments be modified to list, next to this restriction, a positive fine print text stating "Reservations Not Required", thus offsetting the restrictive implication of the age restriction with a permissive statement. To build on the example, if the "21+ Valid ID Required" clause were not selected, then the display region used to display the positive fine print text can remain a blank fine print region.

As a corollary to the use of blank fine print regions in place of permissive fine print clauses when no such permissive clauses are necessary, blank fine print regions can be used in some embodiments to prevent extreme adverse reactions to restrictive fine print clauses. For instance, in some embodiments, when the impact of a restrictive fine print clause is sufficiently negative (e.g., more negative than some predefined or relative threshold), the restrictive fine print clause may automatically be modified to include a null value for that fine print clause to prevent its presentation to a user within the document.

Accordingly, using the locations and domain associated with a document, the server system 102 is able to identify relevant fine print clauses, transmit them for presentation to a user, and generate a specifically tailored set of fine print for the document based on the user selections. Because this specifically tailored set of fine print can be generated as structured data, the server system is further able to generate a presentation of the fine print that can maximize the effectiveness (e.g., user friendliness, clarity, or the like) of the fine print of the document.

User Interfaces

Figure 7A:

In addition, as described herein, embodiments of the present invention are able to receive relevant fine print clauses and configure a fine print clause data structure for use with a given document. Turning now to FIG. 7A, an example user interface 700 is shown for generation of a promotion (one particular type of document that may be generated using example embodiments described herein), with which a fine print developer may interact. Embodiments of the present invention may be implemented using user interface 700, which may in one example embodiment comprise a web user interface. In this regard, the user interface 700 may comprise a graphical user interface that enables a user, another computing device connected to the interface 700, or the like, to generate and update fine print for a document.

As shown in FIG. 7A, user interface 700 may display fine print clauses for selection. In this regard, the user interface 700 may separate the displayed fine print clauses according to their relevance. For instance, required fine print 702 (identified using either default rules retrieved from corresponding fields of the fine print clause data structure, or using rules retrieved in a mapping data structure and received from the server system 102, as described above) may be presented first, followed by recommended fine print 706 (fine print that, by rule, is shown and may also be preselected for inclusion in the fine print string), followed by a button 708, corresponding to all relevant fine print that is not shown by rule to the user, but which may become visible after selection of button 708. User interface 700 further shows configurable text 704 (in this case a text box, but which, as described previously, may alternatively be a dropdown menu). Moreover, user interface 700 includes a "Redemption Instructions" field 710, into which a fine print developer may insert ad hoc additional fine print that might not be presented to the developer initially. The redemption instructions field 710 ensures flexibility of the fine print generation process, as the fine print developer retains the option to manually enter any additional fine print clauses that are not already displayed by the user interface. In this regard, the redemption instructions field 710 may in some embodiments include null functionality, in which a user can proactively select that the value for a given fine print clause is "null," which renders the fine print section blank. In some embodiments, as mentioned above, this may occur automatically if the negative impact of the fine print clause is particularly large. In other embodiments, there may be situations where one or more permissive fine print clauses would otherwise be displayed by default despite not being needed to offset the negative impact of restrictive fine print clauses. In such situations, the fine print developer may utilize the null functionality to prevent display of a subset of the one or more of the permissive fine print clauses to streamline the content of the document. Finally, the interface 700 also displays the currently selected redemption locations 712, and a button 714 enabling a user to designate a new location at which redemption will be allowed.

Alternatively or additionally, in some examples, a user interface may include one or more drop down boxes or other types of list boxes that contain fine print clauses that relate to certain messages that would be included in the fine print of the promotion. For example, in an Italian restaurant promotion, a first box may contain a listing of quantity clauses (e.g., limit one per person; limit one per person, may buy one as a gift, etc.) and a second box containing a list of dining option clauses (e.g., dine in, take out or dine in/take out). Other display methods may be used in other example embodiments.

Figures 7B, 7C, 7D:
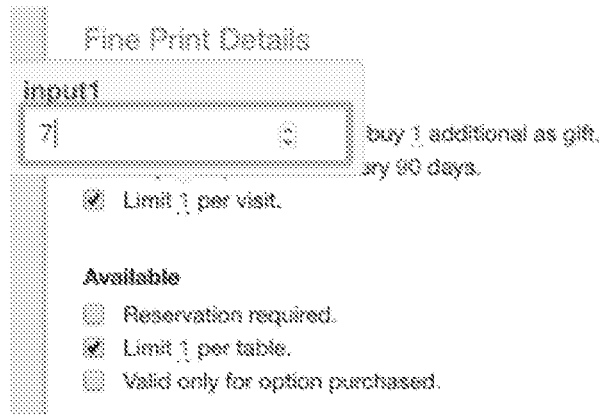

For instance, FIGS. 7B-7D illustrate a snapshot of a series of interactions that may take place to configure a particular fine print clause. As shown in FIG. 7B, a series of fine print clauses may be displayed to the fine print developer for selection and/or modification. As shown in FIG. 7C, configurable portions of those fine print clauses may be selected, which can cause presentation of a text window enabling selection of a particular value to associate with the fine print clause. In the manner discussed previously in connection with FIGS. 4A-4C, 5, 6A, and 6B, selection of particular values may update corresponding fine print clause data structures and/or configurable text data structures. FIG. 7D shows the user interface after selection of a particular value for a particular instance of configurable text. FIGS. 7E, 7F, and 7G show a similar series of snapshots illustrating this process occurring for selection of a date field associated with another fine print clause.

Figure 7H:
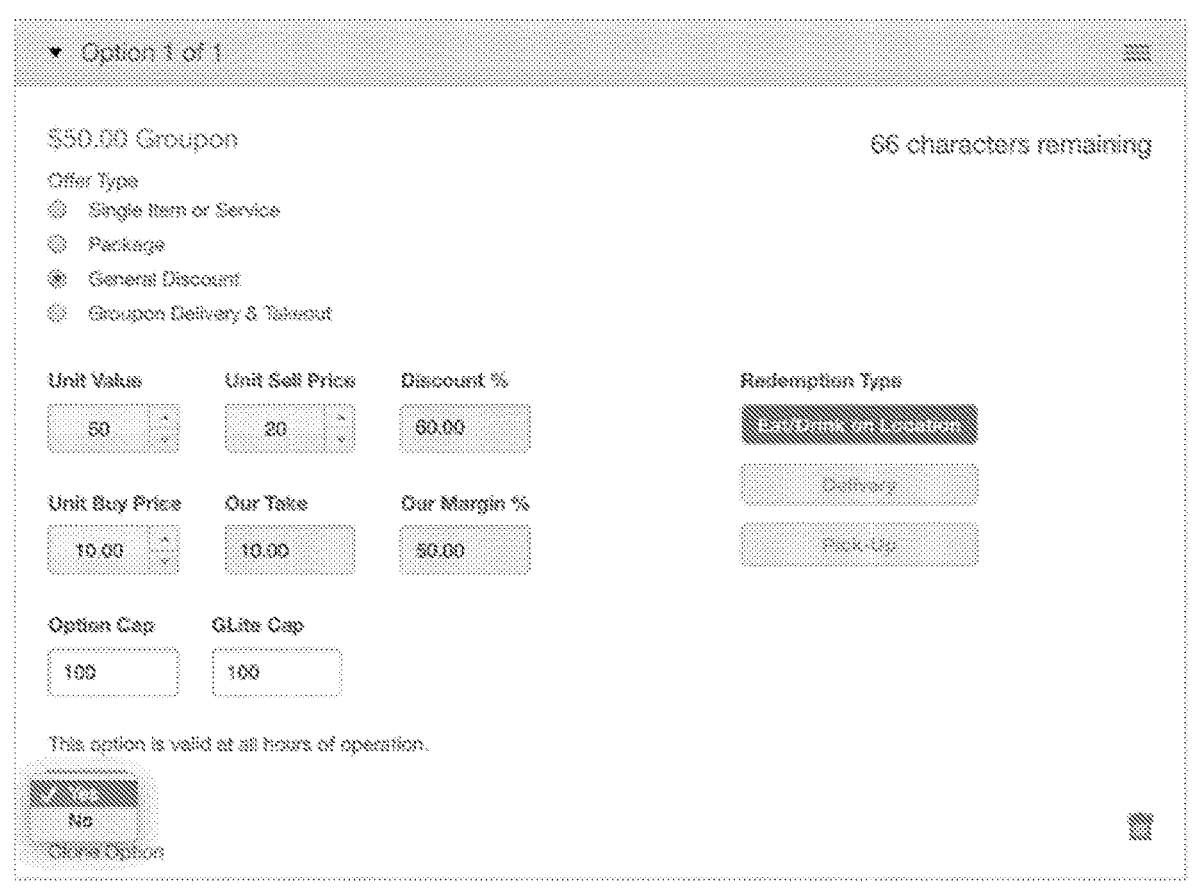
Figure 7I:
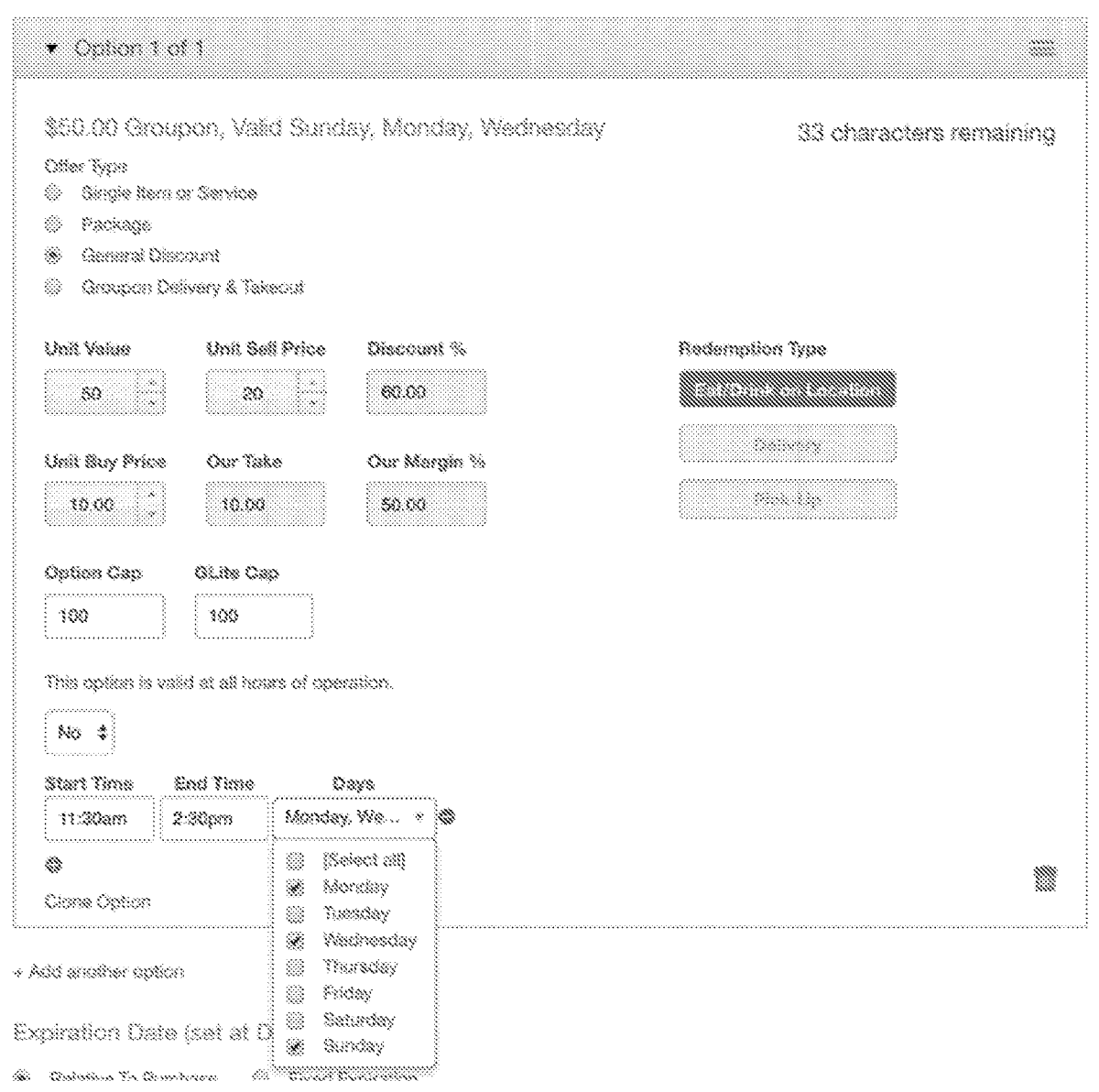
Figure 7J:

Turning now to FIG. 7H, a user interface is shown for selection of blackout times for a particular promotion. FIG. 7I illustrates the fields that may be utilized to select specific time periods and days of the week in this regard. FIG. 7J illustrates a field enabling selection of particular blackout days. FIG. 7K illustrates fine holiday blackout dates that may in one instance not be recommended due to their detrimental impact on promotion redemption. However, when such fields are selected, as shown in FIG. 7L, the corresponding fine print that is generated may describe the blackout holiday days.

Fine Print Developer Operations

FIG. 8 illustrates a flowchart containing example operations for generating a fine print clause data structure from the perspective of a user interface with which a sales representative or merchant interacts. The operations illustrated in FIG. 8 may, for example, be performed by a fine print developer using a server device 104 (e.g., as a kiosk, in which case the fine print developer interacts directly with a input/output circuitry of the server device 104) or a developer device 116 comprising a separate device as described previously. In the former case, the operations illustrated in FIG. 8 may be performed by an apparatus 200, although for ease of explanation, these operations are described in connection with the developer device embodiment, in which the operations illustrated in FIG. 8 are performed with the assistance of, and/or under the control of one or more other devices, such as apparatus 300, and may use processor 302, memory 304, user interface 306, and communications circuitry 308.

In operation 802, apparatus 300 includes means, such as user interface 302, communications circuitry 308, or the like, for receiving identifying information that identifies one or more locations and a domain associated with a document. In example embodiments where the document comprises a promotion, this may comprise receiving a set of locations at which a customer may redeem the promotion and either a product or a service associated with the promotion. In this regard, the identifying information may be provided by the fine print developer.

In operation 804, apparatus 300 includes means, such as user interface 302, communications circuitry 308, or the like, for transmitting the identifying information to a server device 102, which identifies fine print clause data structures relevant to the identifying information.

Subsequently, in operation 806, apparatus 300 includes means, such as user interface 302, communications circuitry 308, or the like, for receiving, based on the identifying information, information including a set of relevant fine print clause data structures. In some embodiments, this information also may include information, originally retrieved from a mapping data structure, indicating whether a fine print clause associated with the fine print clause data structure is required for the promotion, selected for inclusion in the promotion, or should be shown to a user for selection.

In operation 808, the apparatus 300 may include means, such as user interface 306, or the like, for displaying one or more fine print clauses received in operation 806. In one embodiment, the one or more fine print clauses may be displayed based on either the default rules contained in the corresponding fine print clause data structures, or in rules received from a mapping data structure. Either way, based on the chosen default rules, displaying the one or more fine print clauses may first include determining from the received information, for each fine print clause data structure, whether an associated fine print clause is required for the promotion, selected for inclusion in the promotion, or should be shown for selection by a user. As a result, displaying fine print clauses is based on this determination, because the one or more fine print clauses that are displayed comprise only those fine print clauses that are required for the promotion, selected for inclusion in the promotion, or that should be shown to a user for selection (i.e., irrelevant fine print clauses will not even be visible on the user interface presented to the fine print developer).

In some embodiments, the nature of the display of the one or more fine print clauses may be based on a rating of each of the fine print clauses. The rating may, as described previously, be stored as a field within each fine print clause data structure, and therefore may easily be retrieved. Based on the rating, the apparatus 300 may include means, such as the user interface 306, or the like, for adjusting the prominence of the various fine print clauses. In one such embodiment, adjusting the prominence may include listing some fine print clauses higher on the page than others. In another such embodiment, font, color, and/or text sizes may be manipulated to increase or decrease the prominence of fine print clauses based on their corresponding ratings. In yet another embodiment, if a fine print clause has a particularly high or low rating, the fine print clause may be reclassified as a required clause (which is shown and cannot be deselected) or a non-recommended clause (which is not shown to the fine print developer at all).

Additionally or alternatively, the rating may be indicative of the success (in monetary terms, by user traffic, by advertising penetrations, or by any other desired metric) that the fine print clause imparts on a document when associated with a particular mapping of a domain with one or more locations. As a result, in some embodiments, displaying the one or more fine print clauses may include displaying a numerical or graphical indication of the rating of each fine print clause in association with the displayed fine print clause. Moreover, in some such embodiments, the apparatus 300 may update the rating display based on the effect that inserted configurable text may have on the rating of a fine print clause. For instance, in the previously recited example in which the fine print clause recites "Limit <property name='purchase_limit_per_person'>1</> per person," the default text is "1" and the calculated rating may indicate that inclusion of the fine print clause can be estimated to increase profit by 5% (the first unit sells at a discount, but prompts repeat purchases that otherwise would not have occurred). However, if the configurable text is configured such that the clause recites "Limit 5 per person," the rating of the fine print clause may be updated based on data in the historical database 110 to reflect that the impact of the fine print clause is estimated to decrease profit by 15% (although total sales may rise, data in the historical database 110 may suggest that this higher limit per person would eliminate the potential for full-price repeat visits while also causing some potential full price purchasers to instead purchase at the discount price). In some example embodiments, some fine print clauses may be suggested by the system based on the fine print maximizing a margin value when compared to other fine print combinations.

In a further extension of this embodiment, the display may further identify a reason for the change in the rating based on the change in the configurable text. For example, in an example where the promotion is $5 for $15 worth of pizza, one fine print clause may recite "Eligible for <property name='patron_type'> take out</> customers only." The historical database 110 may suggest that people do not dine in the identified locations, and accordingly, if the configurable fine print were modified such that the fine print stated "Eligible for dine in customers only," the rating of the fine print clause may drop in substantially real-time.

In some embodiments, in response to presenting a display by the user interface, additional information may be received, such as, for example, an additional location (received after selection by the fine print developer of button 714, described previously). Accordingly, based upon the input received by the user interface, the apparatus 300 may optionally return to operation 802.

Thereafter, in operation 810 the apparatus 300 may include means, such as user interface 302, communications interface 306, or the like, for generating a configured fine print clause data structure for the promotion based on the displayed fine print clauses and user input, which is described in greater detail in connection with FIG. 9.

Turning now to FIG. 9, a flowchart is illustrated containing example operations for generating a configured fine print clause data structure. The operations illustrated in FIG. 9 may, for example, be performed by the user device 114 or developer device 116, with the assistance of, and/or under the control of one or more devices, such as apparatus 300, and may use processor 302, memory 304, user interface 306, and communications circuitry 308.

In operation 902, apparatus 300 includes means, such as user interface 302, communications circuitry 308, or the like, for receiving input indicating selection of one or more of the displayed fine print clauses. This operation may include a reactive automated component, in which selection of a fine print clause predicted to have a sufficiently negative impact prompts the apparatus 300 to automatically also select one or more corresponding permissive fine print clauses that offset the negative impact of the selected fine print clause. The correspondences between restrictive fine print clause and corresponding permissive fine print clauses may be predefined and accessed using a lookup table or other similar mechanism, or may be generated by the apparatus 300 in a separate process based on historical analysis of the causal relationship between individual fine print clause data structures and document success (in which the strength of the negative causal relationship of a selected fine print clause having a negative impact can be balanced by automatic selection of a set of permissive fine print clauses having a roughly equivalent positive impact).

In operation 904, apparatus 300 may optionally include means, such as user interface 302, communications circuitry 308, or the like, for receiving input configuring any configurable portions of the selected fine print clauses. As described previously, the configurable portions may be configured via text box input (in which case only certain text entries will be accepted) or a dropdown menu which necessarily has only a limited number of selections. This operation is considered optional because some fine print clauses might not be modifiable.

In operation 906, apparatus 300 may optionally include means, such as user interface 302, communications circuitry 308, or the like, for receiving free-text entry of additional fine print clauses. As described previously with respect to FIG. 7A, the user interface 700 may allow the fine print developer to enter additional fine print clauses or enter null values for fine print clauses that otherwise would be planned for inclusion in the fine print associated with a document.

Finally, in operation 908, apparatus 300 includes means, such as processor 302, or the like, for creating a set of configured fine print clause data structures corresponding to the selected fine print clauses and any free-text fine print clauses entered. Notably, although the fine print clause field 404 may be modified in a given instance of a fine print clause data structure, the configured fine print clause data structure retains the same GUID as the template version of the fine print clause data structure. In doing so, example embodiments greatly reduce the number of GUIDs necessary to be stored by the server system 102, thus improving the technical efficiency of the operations recited herein.

Returning now to FIG. 8, in operation 812, apparatus 300 includes means, such as user interface 302, communications circuitry 308, or the like, for transmitting the set of configured fine print clause data structures to the server system 102, which may then generate a document that includes the configured set of fine print clause data structures in the manner described above in connection with FIGS. 5 and 5B.

Operations for Rating Fine Print Clauses

Embodiments of the present invention described above illustrate some example ways in which a server system can be leveraged to improve the generation of fine print for documents. However, understanding the impact that fine print may have on a document may further streamline process by which a fine print developer will curate the fine print for a document. Accordingly, FIG. 10 illustrates a flowchart containing example operations for dynamically updating fine print clause data structures to incorporate rating information, and FIG. 11 illustrates an example method for generating this rating information based on historical data. The operations illustrated in FIGS. 10 and 11 may, for example, be performed by the server system 102 (e.g., server device 104), with the assistance of, and/or under the control of one or more devices, such as apparatus 200, and may use processor 202, memory 204, input/output circuitry 206, and communications circuitry 208.

In operation 1002, apparatus 200 includes means, such as processor 202 or the like, for identifying a fine print clause data structure. In this regard, the operations described in FIG. 10 may be performed for every fine print clause data structure stored in clause database 108 in a batch process on a periodic or ad hoc basis, may be performed for only recently used fine print clause data structures (e.g., at some predetermined interval after generation of a document including a given fine print clause data structure), or may be performed for random fine print clause data structures at periodic intervals.

In operation 1004, the apparatus 200 may include means, such as clause rating circuitry 210 or the like, for rating a performance impact of the fine print clause data structure. In this regard, an example series of steps for rating the performance impact is discussed in greater detail with respect to FIG. 11 as follows.

First, in operation 1102, apparatus 200 includes means, such as processor 202, or the like, for identifying which previously generated documents include the fine print clause data structure. This process may comprise querying the historical database 110 using the GUID 402 of the fine print clause data structure or, in some embodiments, the GUID 416 of specific configurable text stored in a fine print clause field 404 of a given fine print clause data structure. The set of previously generated documents retrieved in response to the query comprises those historically generated documents that are associated with the same fine print clause data structure or one having similar component elements.

In operation 1104, the apparatus 200 may include means, such as processor 202, clause rating circuitry 210, or the like, for evaluating success of the previously offered promotions that include the fine print clause data structure. The success of a previously generated document may be gathered in different ways for different types of documents. For instance, if the document comprises a promotion, this success evaluation may be based on performance information that includes, as previously noted, the number of impressions of the promotion delivered, the number of conversions (e.g., purchases of the promotion), and the number of redemptions associated with the promotion, as well as the relevant timeframes for each of these events. Moreover, the performance indication may further include the promotions' return on investment, rate of sales, total revenue, upsell amount, additional spending prompted by the promotion, and/or any other factor that may indicate relative success or failure of a promotion, as can be calculated by the server system 102. The success of other types of documents may be evaluated in different ways. For instance, the server system 102 may distribute surveys to end-users interacting with the documents and may then evaluate the survey results as a heuristic for success. The particular questions included in a given survey may be domain specific, but with respect to fine print, may request user input to evaluate the clarity of fine print terms. Additionally or alternatively, the success of documents can be determined based on amount of use of the previously generated documents, with more frequent utilization being a heuristic indicator of success.

After having evaluated the success of the previously generated documents, in operation 1106 the apparatus 200 includes means, such as such as processor 202, clause rating circuitry 210, or the like, for calculating the significance of particular components of the fine print associated with those documents, and more specifically, the success of the particular fine print clause data structure being rated. In this regard, as the sample size of historical documents grow, the apparatus 200 will be increasingly able to control for variables other than individual fine print clauses, and may thus be able to determine the causal relationship between individual fine print clause data structures and document success. In this regard, the apparatus 200 may apply a multivariable linear regression model, including the fine print clauses and other fine print parameters to determine the impact of a given fine print clause on document success.

In operation 1108, the apparatus 200 may include means, such as processor 202, memory 204, clause editing circuitry 212, clause database 108, or the like, for generating a rating of the fine print clause data structure based on the calculated significance. In some embodiments, this rating may be a numerical rating, while in others, the rating may itself be a data structure comprising numerical information correlating to the particular domain of a document (e.g., a fine print clause may be more impactful for a document of one type than another, and the rating data structure may capture this distinction).

Returning now to FIG. 10, in operation 1008, the apparatus 200 may include means, such as processor 202, memory 204, clause editing circuitry 212, clause database 108, or the like, for storing the generated rating in a field of the fine print clause data structure. In some embodiments, the apparatus 200 may update mapping data structures based on the ratings of the fine print clause data structures.

Accordingly, by evaluating the impact of fine print clauses on document performance, the fine print clause data structures and mapping data structures may be revised to incorporate rating information that can facilitate improved fine print selection by a fine print developer.

Some examples that utilize this rating information are described above in connection with FIGS. 12A-12D.

Figure 12A:
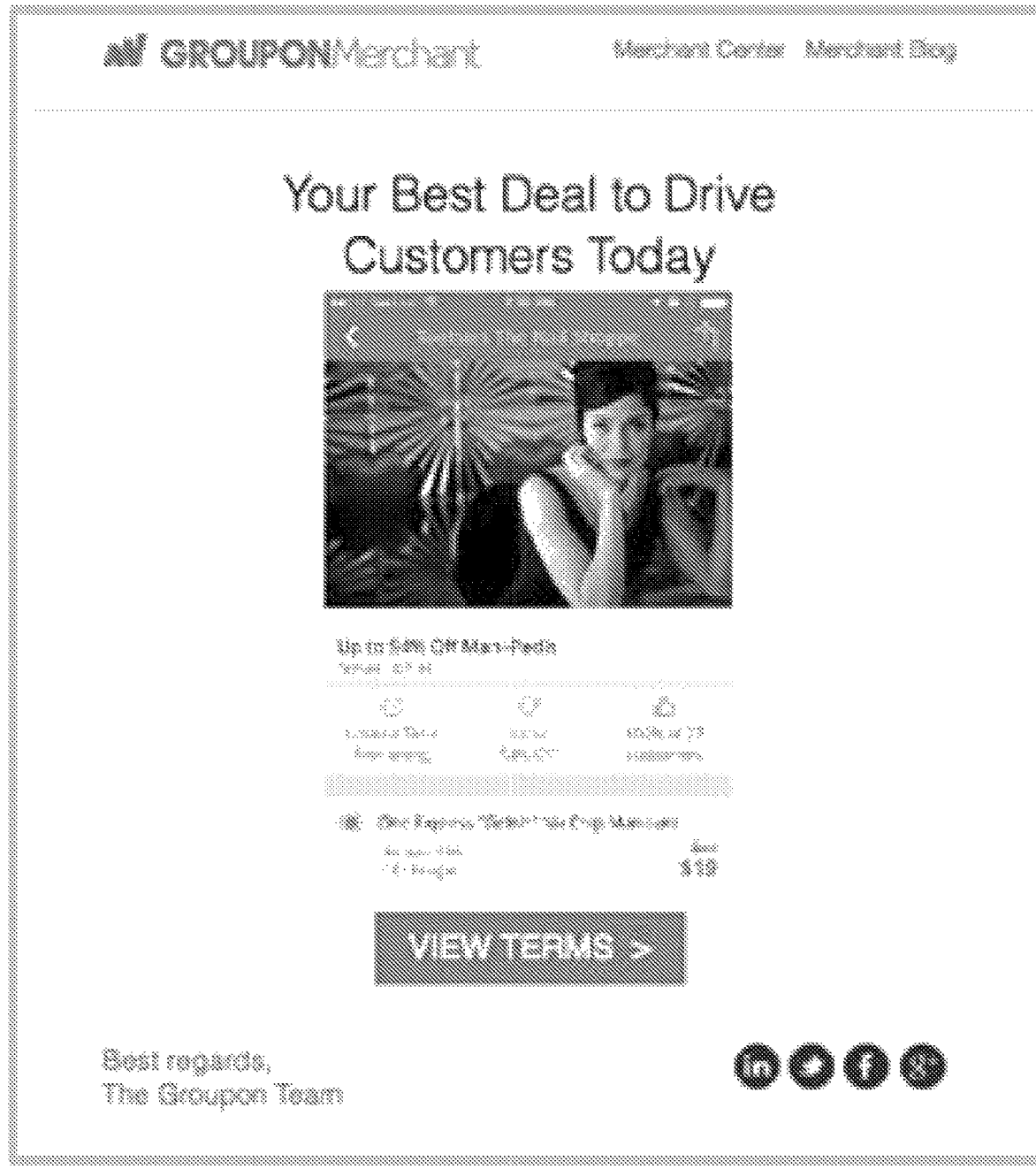

For instance, FIG. 12A illustrates a user interface that may be presented by a developer device to incentivize the generation of an optimal templated promotion. As shown in FIG. 12A, particular arrangements of fine print clauses can be identified that, if included in a promotion offered by a given fine print developer, may result in excellent customer conversion. Rather than leave the selection of fine print to a manual process, a template fine print set can be delivered for adoption by the fine print developer in a wholesale fashion.

As another example, FIG. 12B illustrates the concept of nudging users into selection of optimal fine print. As shown in FIG. 12B, a fine print selection interface is shown, similar to those illustrated in FIGS. 7A-7L. However, the arrangement of required and optional fine print clauses are predefined in a manner that prevents the fine print developer from designing a poor quality promotion. Moreover, by using strategically identified default text for variable components in the configurable text elements of given fine print clauses, (e.g., the number "2" as the default field for the limit of tastings and limit of drinks) the server system 102 can improve the likelihood that the fine print developer will select optimal arrangements of fine print clauses even while not mandating such selection.

Figures 12C, 12D:
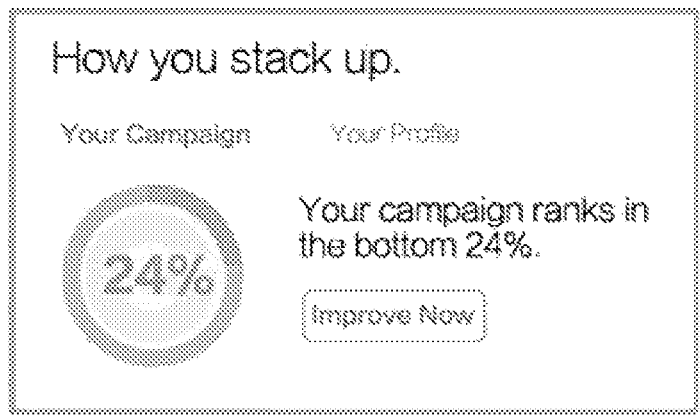

FIG. 12C illustrates the concept of utilizing feedback and comparative analysis to drive fine print developers to improve the quality of fine print selections made for their documents. In this regard, FIG. 12C illustrates that a given fine print developer may have designed a document that is in the bottom 24% of all documents. By selecting the "Improve Now" button, the fine print developer may be presented with a user interface such as that shown in FIG. 12D, which provides recommendations of specific fine print clauses that can be modified to improve the standing of the document.

Figure 12E:
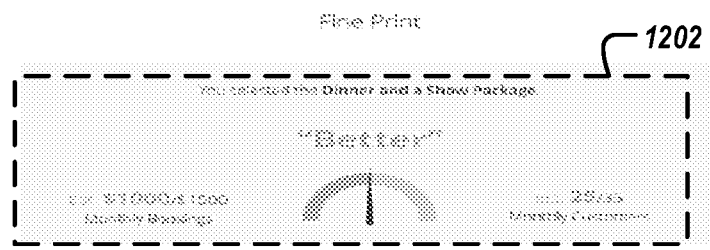
Figure 12E:

FIG. 12E illustrates an example interface that integrates the rating information into the developer's fine print generation experience. The underlying functionality of the interface illustrated in FIG. 12E is similar to that of FIGS. 7A-7L, but in addition to providing configurable fine print clauses for selection, the interface of FIG. 12E also illustrates information regarding the predicted quality of the selected fine print. For instance, element 1202 on the interface provides a description of the relative quality of the document including the currently selected fine print clauses (in the example in FIG. 12E, the document is described as "Better", implying that it is better than average). Moreover, to further improve the quality of the fine print clause selections, element 1204 illustrates an example of a text box with a suggestion for improvement. Accordingly, in the manner shown in FIG. 12E, the fine print clause data structure rating field can be utilized to improve the selections of fine print clauses made initially by the fine print developer.

Fine Print Clause Generation Operations

As described above, embodiments of the present invention automate the process of generating fine print for documents based on standardizing data structures for particular fine print clauses. In some embodiments, the standardized fine print clauses are created using the institutional knowledge of fine print developers or other domain experts. However, in some embodiments, the standardized fine print clauses can be derived from documents that have been previously generated and which are stored in the historical database 110. In this way, initial fine print clause generation can be automated, which may further reduce error and increase the breadth of clauses available for use with the above-described embodiments.

FIG. 13 illustrates a flowchart containing example operations for generating a set of fine print clause data structures in this fashion. The operations illustrated in FIG. 13 may, for example, be performed by the server system 102 (e.g., server device 104), with the assistance of, and/or under the control of one or more devices, such as apparatus 200, and may use processor 202, memory 204, input/output circuitry 206, and communications circuitry 208.

In operation 1302, apparatus 200 includes means, such as processor 202, or the like, for identifying free-text fine print clauses from a set of previously generated documents. These documents may be received, for example, from historical database 110 or may be provided via input/output circuitry 206 or communications circuitry 208. In this regard, a user may have the flexibility to enter free-text clauses above and beyond those clauses currently catalogued in clause database 108 or associated with previously generated documents stored in historical database 110.

In operation 1304, the apparatus 200 may include means, such as processor 202, clause editing circuitry 212, or the like, for extracting free-text fine print clauses from the set of previously generated documents (and/or manually entered fine print clauses). In this regard, the previously generated documents may be parsed into constituent elements, which are then analysed by the apparatus 200 to identify individual grammatical phrases which comprise fine print clauses. In some examples, the identified grammatical phrases may be assigned to a type of a clause (e.g., a quantity clause, an expiration clause or the like) and each clause may be assigned to a particular domain.

Subsequently, in operation 1306, the apparatus 200 may include means, such as such as processor 202, clause editing circuitry 212, or the like, identifying common free-text clauses not available in any known fine print clause data structures. To do this, the free-text entries may be analyzed by the apparatus 200 for patterns of text that arise, frequent words, etc. Based on this identification, common clauses that are not currently available in a fine print clause data structure can be identified.

In operation 1308, the apparatus 200 may include means, such as processor 202, clause editing circuitry 212, or the like, for creating fine print clause data structures for each common free-text fine print clause. In this regard, the most common phrasing may be used as the phrasing of the fine print clause included in each fine print clause data structure. Moreover, in some example embodiments, the fine print clause data structures may be built based on the fine print clause data structures being causally related to increased revenue when compared to other fine print clause data structures. Additionally or alternatively, the apparatus 200 may continue to monitor whether creation of new fine print clause data structures reduces the occurrence of common pattern in free-text entries.

Optionally, in operation 1310 the apparatus 200 may include means, such as processor 202, clause editing circuitry 212, or the like, for associating each new fine print clause data structure with the locations and the domain of the document(s) that include the free-text fine print clause data structure. In this regard, when adding the clause, the apparatus 200 may determine the mappings based on the free text instances (e.g., if the free-text fine print clauses are found in documents pooled largely in one geography, or only in big cities, then the newly created fine print clause data structure will be connected to those locations). As noted previously, this association may comprise creating a mapping data structure that can be queried to identify the newly created fine print clause data structures.

Finally, in operation 1312, the apparatus 200 may optionally also include means, such as processor 202, memory 204, clause editing circuitry 212, or the like, for updating fields of the fine print clause data structures to indicate default instructions. As discussed previously and shown in FIG. 4A, each created clause data structure includes fields with default options for how the fine print clause should be presented to the user if the mapping data structure fails to include specific instructions. Accordingly, although the fine print clauses may be manually designed, and the fine print clause data structures may be manually created based thereon, as shown herein some embodiments may automatically generate template fine print clauses and fine print clause data structures based on previously generated documents.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for improved utilization of fine print for a document, the apparatus comprising a processor and a memory, the memory storing computer program code that, when executed by the processor, causes the apparatus to:
   receive, from a developer device, information identifying a location and a domain associated with the document;
   identify, based on the received location and domain, a set of fine print clause data structures relevant to the location and the domain, wherein each particular fine print clause data structure in the set of fine print clause data structures comprises a first GUID and a configurable text data structure, wherein the configurable text data structure comprises a second GUID, wherein the first GUID and the second GUID are configured to be queried;
   determine, for each particular fine print clause data structure in the set of fine print clause data structures, if each is associated with a negative impact;
   determine, for one or more of the fine print clause data structures associated with the negative impact, a recommendation of an offsetting fine print clause data structure;
   transmit an indication of the set of identified fine print clause data structures and an indication of the offsetting fine print clause data structure to the developer device;
   receive, from the developer device and in response to transmission of the indication of the set of identified fine print clause data structures and the indication of the offsetting fine print clause data structure, an indication of a selection of a subset of the set of fine print data structures; and
   cause generation of a visual representation of the document on a user interface that displays fine print clauses corresponding to the subset of the set of fine print data structures, wherein causing generation of the visual representation of the documents on the user interface comprises transmitting a string storing the fine print clauses corresponding to the subset of the set of fine print data structures for display.

2. The apparatus of claim 1, wherein identifying the set of fine print clause data structures relevant to the location and the domain comprises:
   searching the memory for one or more mapping data structures associated with the received location and domain;
   receiving search results comprising the one or more mapping data structures; and
   retrieving fine print clause data structures identified within the one or more mapping data structures; and
   wherein the fine print clause data structures relevant to the location and the domain comprise the retrieved fine print clause data structures.

3. The apparatus of claim 2, wherein the computer program code, when executed by the processor, further causes the apparatus to:
   retrieve, from the one or more mapping data structures and for each fine print clause data structure in the set of fine print clause data structures, presentation information indicating whether a fine print clause associated with the fine print clause data structure should be shown to a user for selection, should be pre-selected for inclusion, or is required; and
   wherein transmitting the indication of the set of identified fine print clause data structures and the indication of the offsetting fine print clause data structure to the developer device includes transmitting the presentation information.

4. The apparatus of claim 1, wherein the offsetting fine print clause data structure is associated with a positive impact to offset the negative impact of the fine print clause data structure associated with the negative impact; and
   wherein transmitting the indication of the set of identified fine print clause data structures to the developer device includes transmitting an indication associating the offsetting fine print clause data structure associated with the positive impact with the corresponding fine print clause data structure associated with the negative impact.

5. The apparatus of claim 1, wherein the computer program code, when executed by the processor, further causes the apparatus to:
   determine whether the subset of the set of configured fine print data structures comprises an optimal set of fine print data structures for the document.

6. The apparatus of claim 5, wherein each fine print clause data structure includes a rating indicating its impact upon performance of the document, and wherein determining whether the subset of the set of configured fine print data structures comprises an optimal set of fine print data structures for the document is based on the rating of each fine print clause data structure in the subset of the set of fine print data structures.

7. The apparatus of claim 5, wherein the computer program code, when executed by the processor, further causes the apparatus to:
   transmit an indication of whether the subset of the set of configured fine print data structures comprises an optimal set of fine print data structures for the document.

8. The apparatus of claim 5, wherein the computer program code, when executed by the processor, further causes the apparatus to:
   in an instance in which the subset of the set of configured fine print data structures does not comprise an optimal set of fine print data structures for the document, generate a recommended modification to the subset of the set of fine print data structures; and transmit an indication of the recommended modification.

9. A method for improved utilization of fine print for a document, the method comprising:
receiving, from a developer device, information identifying a location and a domain associated with the document;
identifying, by a processor and based on the received location and domain, a set of fine print clause data structures relevant to the location and the domain, wherein each particular fine print clause data structure in the set of fine print clause data structures comprises a first GUID and a configurable text data structure, wherein the configurable text data structure comprises a second GUID, wherein the first GUID and the second GUID are configured to be queried;
determining, for each particular fine print clause data structure in the set of fine print clause data structures, if each is associated with a negative impact;
determining, for one or more of the fine print clause data structures associated with the negative impact, a recommendation of an offsetting fine print clause data structure;
transmitting an indication of the set of identified fine print clause data structures and an indication of the offsetting fine print clause data structure to the developer device;
receiving, from the developer device and in response to transmission of the indication of the set of identified fine print clause data structures and the indication of the offsetting fine print clause data structure, an indication of a selection of a subset of the set of fine print data structures; and
causing generation of a visual representation of the document on a user interface that displays fine print clauses corresponding to the subset of the set of fine print data structures, wherein causing generation of the visual representation of the documents on the user interface comprises transmitting a string storing the fine print clauses corresponding to the subset of the set of fine print data structures for display.

10. The method of claim 9, wherein identifying the set of fine print clause data structures relevant to the location and the domain comprises:
searching a memory for one or more mapping data structures associated with the received location and domain;
receiving search results comprising the one or more mapping data structures; and
retrieving fine print clause data structures identified within the one or more mapping data structures; and
wherein the fine print clause data structures relevant to the location and the domain comprise the retrieved fine print clause data structures.

11. The method of claim 10, further comprising:
retrieving, from the one or more mapping data structures and for each fine print clause data structure in the set of fine print clause data structures, presentation information indicating whether a fine print clause associated with the fine print clause data structure should be shown to a user for selection, should be pre-selected for inclusion, or is required; and
wherein transmitting the indication of the set of identified fine print clause data structures and the indication of the offsetting fine print clause data structure to the developer device includes transmitting the presentation information.

12. The method of claim 9, wherein the offsetting fine print clause data structure is associated with a positive impact to offset the negative impact of the fine print clause data structure associated with the negative impact; and
wherein transmitting the indication of the set of identified fine print clause data structures to the developer device includes transmitting an indication associating the offsetting fine print clause data structure associated with the positive impact with the corresponding fine print clause data structure associated with the negative impact.

13. The method of claim 9, further comprising:
determining, by the processor, whether the subset of the set of configured fine print data structures comprises an optimal set of fine print data structures for the document.

14. The method of claim 13, wherein each fine print clause data structure includes a rating indicating its impact upon performance of the document, and wherein determining whether the subset of the set of configured fine print data structures comprises an optimal set of fine print data structures for the document is based on the rating of each fine print clause data structure in the subset of the set of fine print data structures.

15. The method of claim 13, further comprising:
transmitting an indication of whether the subset of the set of configured fine print data structures comprises an optimal set of fine print data structures for the document.

16. The method of claim 13, further comprising:
in an instance in which the subset of the set of configured fine print data structures does not comprise an optimal set of fine print data structures for the document, generating, by the processor, a recommended modification to the subset of the set of fine print data structures; and
transmitting an indication of the recommended modification.

17. A computer program product for improved utilization of fine print for a document, the computer program product comprising a computer-readable storage medium storing computer program code that, when executed by an apparatus, causes the apparatus to:
receive, from a developer device, information identifying a location and a domain associated with the document;
identify, based on the received location and domain, a set of fine print clause data structures relevant to the location and the domain, wherein each particular fine print clause data structure in the set of fine print clause data structures comprises a first GUID and a configurable text data structure, wherein the configurable text data structure comprises a second GUID, wherein the first GUID and the second GUID are configured to be queried;
determine, for each particular fine print clause data structure in the set of fine print clause data structures, if each is associated with a negative impact;
determine, for one or more of the fine print clause data structures associated with the negative impact, a recommendation of an offsetting fine print clause data structure;
transmit an indication of the set of identified fine print clause data structures and an indication of the offsetting fine print clause data structure to the developer device;
receive, from the developer device and in response to transmission of the indication of the set of identified fine print clause data structures and the indication of the offsetting fine print clause data structure, an indication of a selection of a subset of the set of fine print data structures; and cause generation of a visual representation of the document on a user interface that displays fine print clauses corresponding to the subset of the set of fine print data structures, wherein causing generation of the visual representation of the documents on the user interface comprises transmitting a string storing the fine print clauses corresponding to the subset of the set of fine print data structures for display.

18. The computer program product of claim 17, wherein identifying the set of fine print clause data structures relevant to the location and the domain comprises:

searching a memory for one or more mapping data structures associated with the received location and domain;

receiving search results comprising the one or more mapping data structures; and retrieving fine print clause data structures identified within the one or more mapping data structures; and wherein the fine print clause data structures relevant to the location and the domain comprise the retrieved fine print clause data structures.

19. The computer program product of claim 18, wherein the computer program code, when executed by the apparatus, further causes the apparatus to:

retrieve, from the one or more mapping data structures and for each fine print clause data structure in the set of fine print clause data structures, presentation information indicating whether a fine print clause associated with the fine print clause data structure should be shown to a user for selection, should be pre-selected for inclusion, or is required; and wherein transmitting the indication of the set of identified fine print clause data structures and the indication of the offsetting fine print clause data structure to the developer device includes transmitting the presentation information.

20. The computer program product of claim 17, wherein the offsetting fine print clause data structure is associated with a positive impact to offset the negative impact of the fine print clause data structure associated with the negative impact; and wherein transmitting the indication of the set of identified fine print clause data structures to the developer device includes transmitting an indication associating the offsetting fine print clause data structure associated with the positive impact with the corresponding fine print clause data structure associated with the negative impact.

* * * * *